United States Patent [19]

Hata

[11] Patent Number: 5,155,630

[45] Date of Patent: Oct. 13, 1992

[54] ZOOM LENS SYSTEM

[75] Inventor: Kazuyoshi Hata, Osaka, Japan

[73] Assignee: Minolta Camera Co., Ltd., Osaka, Japan

[21] Appl. No.: 624,194

[22] Filed: Dec. 6, 1990

[30] Foreign Application Priority Data

Dec. 8, 1989 [JP] Japan .................. 1-320169

[51] Int. Cl.⁵ ............... G02B 15/14; G02B 13/18
[52] U.S. Cl. ................. 359/687; 358/685; 358/713
[58] Field of Search ........... 350/423, 427; 359/687, 359/685, 713

[56] References Cited

U.S. PATENT DOCUMENTS

| | | | |
|---|---|---|---|
| 4,818,083 | 4/1989 | Mihara | 350/427 |
| 4,859,042 | 8/1989 | Tanaka | 350/427 |
| 4,906,079 | 3/1990 | Mihara et al. | 350/427 |

FOREIGN PATENT DOCUMENTS

| | | |
|---|---|---|
| 59-28120 | 2/1949 | Japan . |
| 1-185608 | 7/1980 | Japan . |
| 56-147113 | 11/1981 | Japan . |
| 60-107013 | 6/1985 | Japan . |
| 60-189722 | 9/1985 | Japan . |
| 60-110112 | 5/1986 | Japan . |
| 61-140913 | 6/1986 | Japan . |
| 62-24213 | 2/1987 | Japan . |
| 63-297187 | 2/1988 | Japan . |
| 64-74517 | 3/1989 | Japan . |
| 1-221715 | 9/1989 | Japan . |
| 2-39011 | 2/1990 | Japan . |

Primary Examiner—Scott J. Sugarman
Attorney, Agent, or Firm—Price, Gess & Ubell

[57] ABSTRACT

The present invention provides a compact zoom lens having a zooming ratio of six (6) to eight (8) and an F-number of 1.4 to 1.6, and comprising from the object side; a first lens unit of a positive refractive power and consisting of, from the object side, a first negative meniscus lens element convex to the object side, a second positive lens element, located at the image side of the first negative meniscus lens element with having an air space therebetween, having a stronger refractive surface on its object side surface; a second lens unit of a negative refractive power and consisting of, from the object side, a third negative lens element having a stronger refractive surface of its image side surface, and a fourth positive lens element, located at the image side of the third negative lens element with having an air space therebetween, said second lens unit including an aspheric surface; a third lens unit of a positive refractive power and consisting of a single positive lens element having an aspheric surface; and a fourth lens unit of a positive refractive power and including a positive lens element and a negative lens element; and the second lens unit being shiftable in the zooming operation and at least one of the first, third and fourth lens unit being also shiftable in the zooming operation.

17 Claims, 18 Drawing Sheets f=52.5 f=52.5 t=52.5 t=52.5

F 1.73
— d
—·— g
--- SC
-0.2  0.2
Spherical Aberration
Sine Condition

Y'=4.1
----- DM
—— DS
-0.2  0.2
Astigmatism

Y'=4.1
-5.0  5.0
Distortion %

F 1.64
— d
—·— g
---
-0.2  0.2
Spherical Aberration
Sine Condition

Y'=4.1
----- DM
—— DS
-0.2  0.2
Astigmatism

Y'=4.1
-5.0  5.0
Distortion %

F 1.64
— d
—·— g
--- SC
-0.2  0.2
Spherical Aberration
Sine Condition

Y'=4.1
----- DM
—— DS
-0.2  0.2
Astigmatism

Y'=4.1
-5.0  5.0
Distortion %

F 1.94
Spherical Aberration
Sine Condition

Y=4.1
Astigmatism

Y=4.1
Distortion %

F 1.64
Spherical Aberration
Sine Condition

Y=4.1
Astigmatism

Y=4.1
Distortion %

F 1.64
Spherical Aberration
Sine Condition

Y=4.1
Astigmatism

Y=4.1
Distortion %

FIG.21a — F1.87 — Spherical Aberration Sine Condition
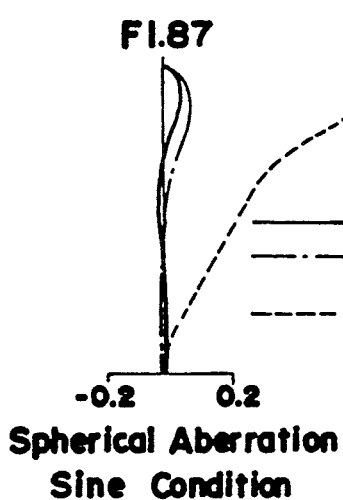
FIG.21b — Y'=4.1 — Astigmatism
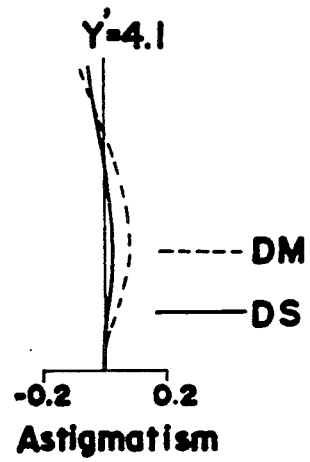
FIG.21c — Y'=4.1 — Distortion %
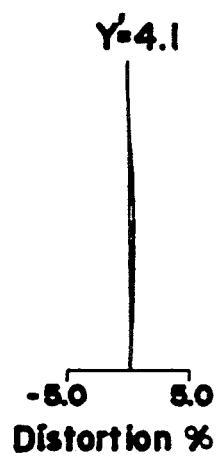
FIG.22a — F1.64 — Spherical Aberration Sine Condition
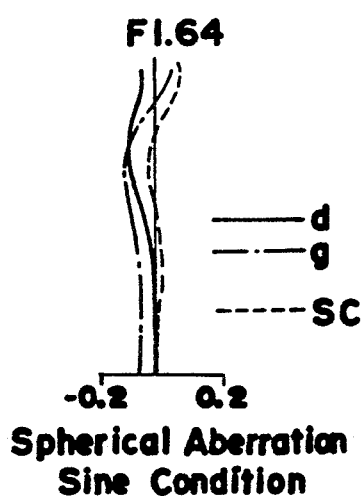
FIG.22b — Y'=4.1 — Astigmatism
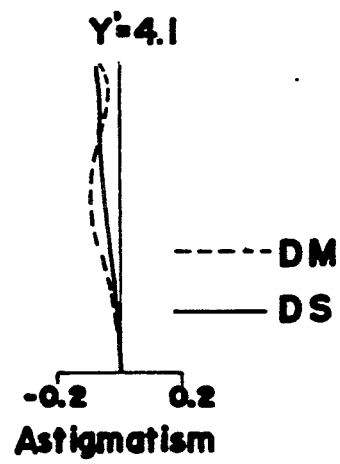
FIG.22c — Y'=4.1 — Distortion %
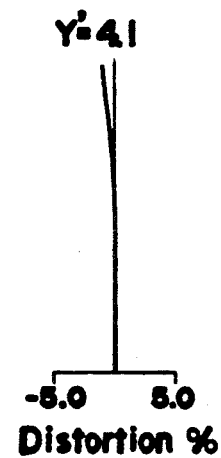
FIG.23a — F1.43 — Spherical Aberration Sine Condition
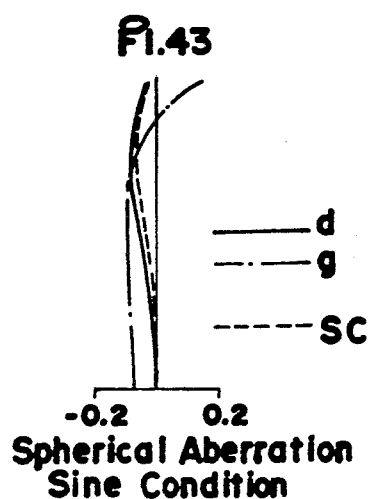
FIG.23b — Y'=4.1 — Astigmatism
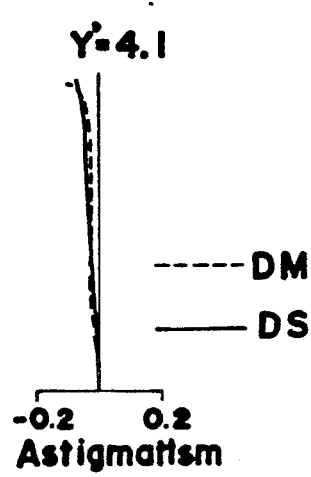
FIG.23c — Y'=4.1 — Distortion %
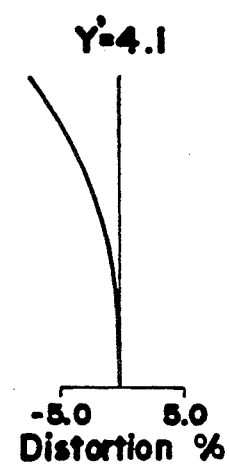

F 1.88
Spherical Aberration
Sine Condition

Y'=4.1
Astigmatism

Y'=4.1
Distortion %

F 1.64
Spherical Aberration
Sine Condition

Y'=4.1
Astigmatism

Y'=4.1
Distortion %

F 1.43
Spherical Aberration
Sine Condition

Y'=4.1
Astigmatism

Y'=4.1
Distortion %

F1.87

Spherical Aberration
Sine Condition

Y'=4.1

Astigmatism

Y'=4.1

Distortion %

F1.64

Spherical Aberration
Sine Condition

Y'=4.1

Astigmatism

Y'=4.1

Distortion %

F1.43

Spherical Aberration
Sine Condition

Y'=4.1

Astigmatism

Y'=4.1

Distortion %

F1.83
Spherical Aberration
Sine Condition

Y'=4.1
Astigmatism

Y'=4.1
Distortion %

F1.64
Spherical Aberration
Sine Condition

Y'=4.1
Astigmatism

Y'=4.1
Distortion %

F1.43
Spherical Aberration
Sine Condition

Y'=4.1
Astigmatism

Y'=4.1
Distortion %

F1.90
Spherical Aberration
Sine Condition

Y'=4.1
Astigmatism

Y'=4.1
Distortion %

F1.64
Spherical Aberration
Sine Condition

Y'=4.1
Astigmatism

Y'=4.1
Distortion %

F1.43
Spherical Aberration
Sine Condition

Y'=4.1
Astigmatism

Y'=4.1
Distortion %

Spherical Aberration
Sine Condition

Astigmatism

Distortion %

Spherical Aberration
Sine Condition

Astigmatism

Distortion %

Spherical Aberration
Sine Condition

Astigmatism

Distortion %

F1.91
— d
—·— g
- - - SC
Spherical Aberration
Sine Condition

Y'=4.1
- - - - DM
——— DS
Astigmatism

Y'=4.1
Distortion %

F1.64
— d
—·— g
- - - SC
Spherical Aberration
Sine Condition

Y'=4.1
- - - - DM
——— DS
Astigmatism

Y'=4.1
Distortion %

F1.43
— d
—·— g
- - - SC
Spherical Aberration
Sine Condition

Y'=4.1
- - - - DM
——— DS
Astigmatism

Y'=4.1
Distortion %

ZOOM LENS SYSTEM

BACKGROUND OF THE INVENTION

1. Field of the Invention

This invention relates to a zoom lens system, and more particularly to a compact zoom lens system suitable for a compact camera such as a video camera.

2. Description of the Prior Art

In recent years, a body of a camera such as a video camera becomes more compact in size and in weight and becomes more cheap, since packaging and integration rate of electric circuits occupied therein have improved. As a result, a volume, weight, and cost of the a lens system occupying in the video camera is increasing relatively, thus it has been a strong demand to make the lens system compact and to reduce the cost thereof.

On the other hand, lens system occupying in video camera is required to have a larger aperture ratio for avoiding the decrease of light intensity on higher image height region caused by compactness of image pick-up device, and also to have a higher performance of a higher integration and a higher resolution.

In the present invention, the optical performance required to the zoom lens system is defined as a zooming ratio of 3 to 8, and an F-number of 1.4 to 1.6. Many type of zoom lens system fulfilling the above-defined optical performance have already been proposed, but almost all proposals require much number of lens elements reaching thirteen (13) or fifteen (15) elements. Therefore, such zoom lens system is difficuit to reduce the cost.

Thus, the other type is proposed in which the number of lens elements required can be decreased by applying at least an aspheric surface, as proposed by Japanese Laid-Open Patent Application Nos. 56-147113 and 61-110112. The former proposes a 4-group zoom lens system comprising from the object side, a first positive lens group, a second negative lens group, a third negative lens group, and a fourth positive lens group, consisting of ten (10) lens elements with applying three aspheric surfaces. Such a zoom lens system, however, cannot fulfills the above-defined optical performance since it has a small zooming ratio of three (3). The latter also proposes a 4-group zoom lens system comprising positive-negative-negative-positive lens groups from the object side and consisting of eight (8) lens elements with applying four aspheric surfaces. The latter proposal cannot fulfills the sufficient optical performance required.

The assignee of the present invention proposes, by Japanese Laid-Open Patent Application Nos. 1-46716 and 1-46717, 3-group zoom lens system comprising from the object side, a first negative lens group, a second positive lens group and a third positive lens group. Such a proposed zoom lens system consists of nine (9) or ten (10) lens elements and has an F-number of 1.2 to 0.9 without applying any aspheric surface. However, the zoom lens system becomes large and the aberrations thereof is deteriorated if its zooming ratio is set to six (6) to eight (8) defined in the present invention.

The assignee of the present invention also proposes, by Japanese Laid-Open Patent Application No. 1-74517, 3-group zoom lens system comprising from the object side, a first positive lens group consisting of only two lens elements, a second negative lens group consisting of only two lens elements, and a third positive lens group. Such a zoom lens system consists of only eight (8) lens elements without applying aspheric surface, and therefore is compact. However, it has a small zooming ratio of 2 to 3 while having a sufficient F-number of 1.6 to 1.4, and is difficult to extend the zooming ratio to about 6.

SUMMARY OF THE INVENTION

A primary object of the present invention is to provide a zoom lens system having a zoom ratio of 3 to 8, and F-number of 1.4 to 1.6 with having a good optical performance.

The other object of the present invention is to provide the zoom lens system which has less number of lens elements and is more compact.

Further other object of the present invention is to provide the zoom lens system with applying aspheric surface to less lens surfaces as possible.

To achieve the above object, the present invention provides a zoom lens system, comprising from the object side; a first lens unit of a positive refractive power and consisting of, from the object side, a first negative meniscus lens element convex to the object side, a second positive lens element, located at the image side of the first negative meniscus lens element with having an air space therebetween, having a stronger refractive surface on its object side surface; a second lens unit of a negative refractive power and consisting of, from the object side, a third negative lens element having a stronger refractive surface on its image side surface, and a fourth positive lens element, located at the image side of the third negative lens element with having an air space therebetween, said second lens unit including an aspheric surface; a third lens unit of a positive refractive power and consisting of a single positive lens element having an aspheric surface; and a fourth lens unit of a positive refractive power and including a positive lens element and a negative lens element; and the second lens unit being shiftable in the zooming operation and at least one of the first, third and fourth lens units being also shiftable in the zooming operation.

In the zoom lens system according to the present invention, the focal length of the whole lens system is mainly changed by the shifting of the second lens unit along the optical axis and the aberration changed by the shifting of the second lens unit is corrected by the shifting of at least one of the first, third and fourth lens units.

The present invention has a specific feature that the first lens unit consists of only two lens elements and the second lens unit also consists of only two lens elements having an aspheric surface to correct the aberrations including the chromatic aberration all over the zooming range. The second lens unit has a relatively strong refractive power in the zoom lens system, and therefore it is effective for correcting the aberrations well to apply an aspheric surface in the second lens unit. The third lens unit transmit the light bundles diverged by the second lens unit to the following fourth lens unit which serves as an image forming function, and is effective for making the fourth lens unit compact. In the present invention, the third lens unit consists of only a single lens element having an aspheric surface for cancelling the spherical aberration and comatic aberration generated by the fourth lens unit. Therefore, the third lens unit is also effective for making the construction of the fourth lens unit simple. In the third lens unit, the main ray of marginal light bundle passes nearby the optical axis of the lens system. Thus, the aspheric surface applied to the third lens unit is capable of controlling the spherical aberration and the comatic aberration without deteriorating the distortion and the field curvature both of which depends on the angle of view. The fourth lens unit must have at least one negative lens element for correcting the chromatic aberration. The fourth lens unit may be consisting of one negative lens element and one positive lens element cemented with each other.

According to the other aspect, the present invention provides a zoom lens system, comprising from the object side; a first lens unit of a positive refractive power and consisting of, from the object side, a first negative meniscus lens element convex to the object side, a second positive lens element, located at the image side of the first negative meniscus lens element with having an air space therebetween, having a stronger refractive surface on its object side surface; a second lens unit of a negative refractive power and consisting of, from the object side, a third negative lens element having a stronger refractive surface on its image side surface, and a fourth positive lens element, located at the image side of the third negative lens element with having an air space therebetween said second lens unit being shiftable in the zooming operation; a third lens unit of a positive refractive power and consisting of a single positive lens element; and a fourth lens unit of a positive refractive power and including a positive lens element and a negative lens element, said fourth lens unit being shiftable to change a variable air space formed between the third lens unit and the fourth lens unit in the zooming operation.

According to further other aspect, the present invention provides a zoom lens system, comprising from the object side; a first lens unit of a positive refractive power and consisting of, from the object side, a first negative meniscus lens element convex to the object side, a second positive lens element, located at the image side of the first negative meniscus lens element with having an air space therebetween, having a stronger refractive surface on its object side surface; a second lens unit of a negative refractive power and consisting of, from the object side, a third negative lens element having a stronger refractive surface on its image side surface, and a fourth positive lens element, located at the image side of the third negative lens element with having an air space therebetween; a third lens unit of a positive refractive power and consisting of a fifth single positive lens element; and a fourth lens unit of a positive refractive power and consisting of a positive lens element and a negative lens element cemented with each other; wherein the whole lens system consists of seven lens element; and wherein the second lens unit is shiftable in the zooming operation and at least one of the first, third and fourth lens unit is also shiftable in the zooming operation.

The features of the present invention which are believed to be novel are set forth with particularity in the appended claims. The present invention, both as to its organization and manner of operator, together with further objects and advantages thereof, may best be understood by reference to the following description, taken in conjunction with the accompanying drawings.

BRIEF DESCRIPTION OF THE DRAWINGS

FIGS. 21a to 21c represent the aberration curves of the fourth embodiment in the longest focal length condition;

FIGS. 22a to 22c represent the aberration curves of the fourth embodiment in the medium focal length condition;

FIGS. 23a to 23c represent the aberration curves of the fourth embodiment in the shortest focal length condition;

DETAILED DESCRIPTION OF THE PREFERRED EMBODIMENTS

Figure 1:
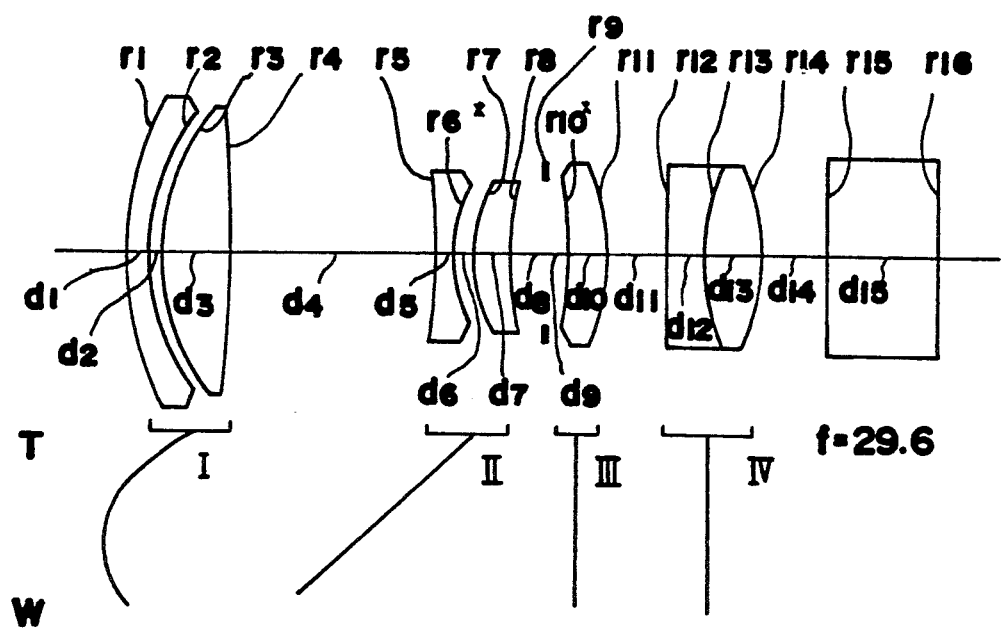
FIG. 1 represents a cross sectional view of the zoom lens system according to the first embodiment of the present invention in the longest focal length condition.

The following description is provided to enable any person skilled in the optical and camera field to make and use the invention and set forth the best modes contemplated by the inventor for carrying out his invention. Various modifications, however, will remain readily apparent to those skilled art, since the generic principles of the present invention have been defined herein specifically to provide a relatively economical and easily manufactured compact zoom lens system. The deviation of the formulas and the relation of the powers set forth herein can be accomplished with assistance of a computer. The present invention represents the parameters of a compromise balance of acceptable aberrations which can be relatively easily manufactured to provide a low cost lens system for utilization with an electronic still camera, video camera and the like.

In the drawings, schematic cross sectional views disclose the position of the lens groups and lens elements for the longest focal length with lines below the lens groups representing the directions of their movements for zooming toward the shortest focal length.

Due to the number of lens elements involved, it was not deemed appropriate to include individual designation of radii of curvature and axial distances for each lens element and air space. These values. however, are provided in the accompanying tables set forth herein, and the schematic cross sectional views of the respective embodiments follow the normal conventions of an object at the left-hand side of the drawing and the image plane at the right-hand side.

Figure 2:
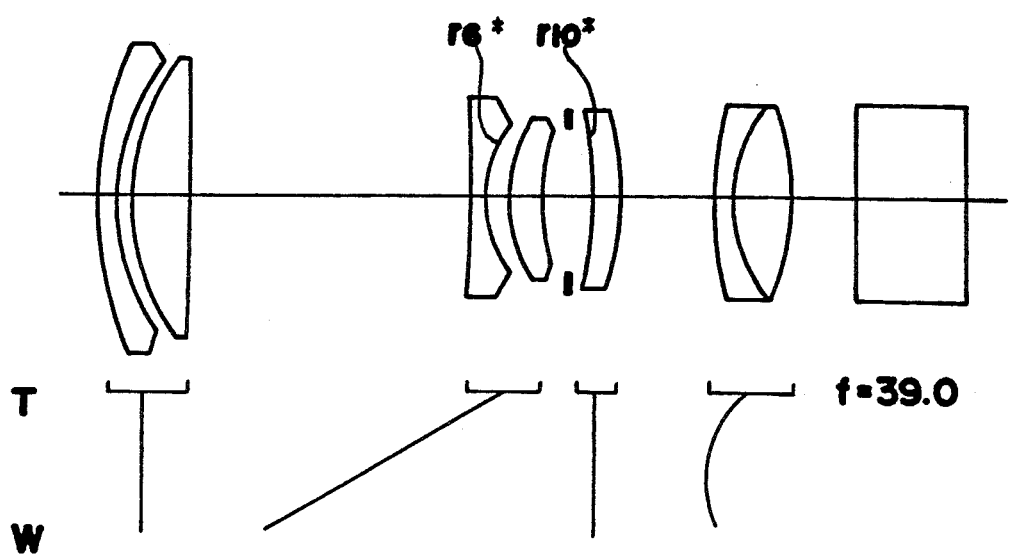
FIG. 2 represents a cross sectional view of the zoom lens system according to the second embodiment of the present invention in the longest focal length condition.
Figure 3:
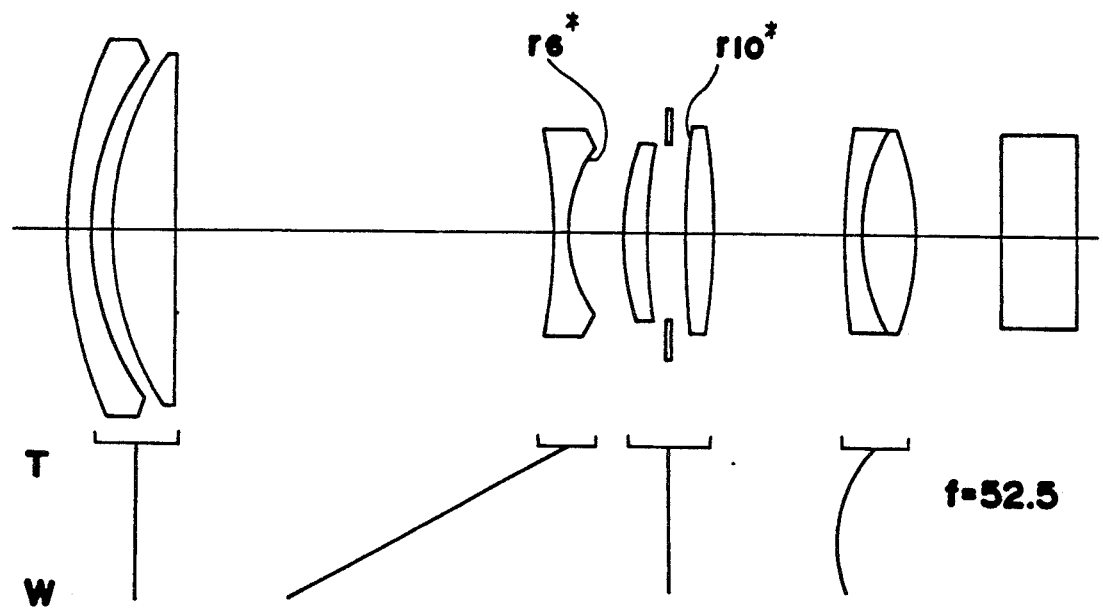
FIG. 3 represents a cross sectional view of the zoom lens system according to the third embodiment of the present invention in the longest focal length condition.
Figure 4:
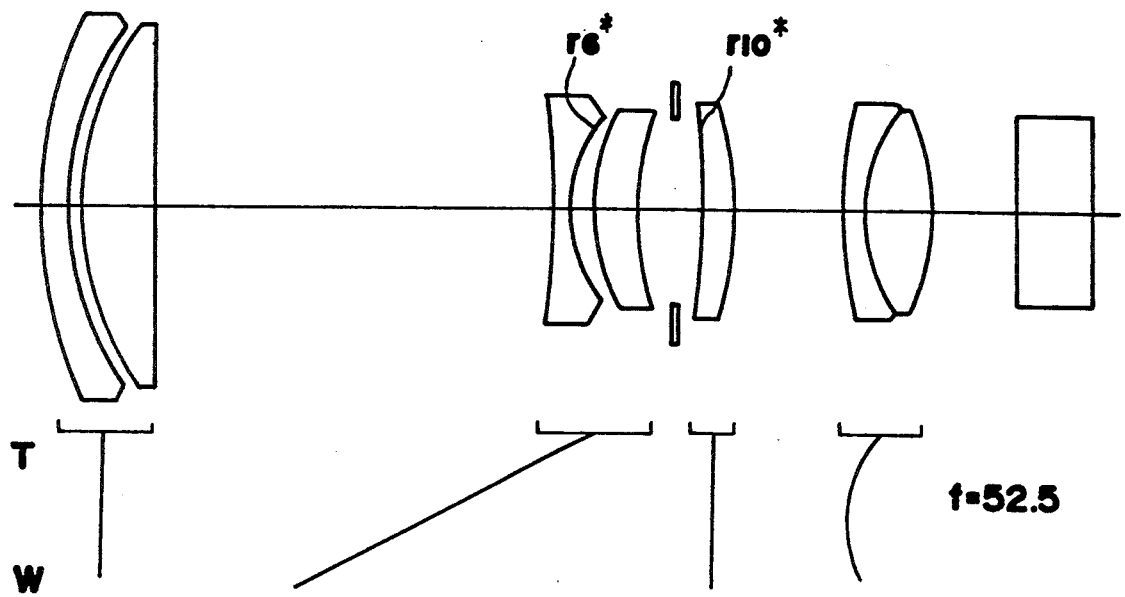
FIG. 4 represents a cross sectional view of the zoom lens system according to the fourth embodiment of the present invention in the longest focal length condition.
Figure 5:
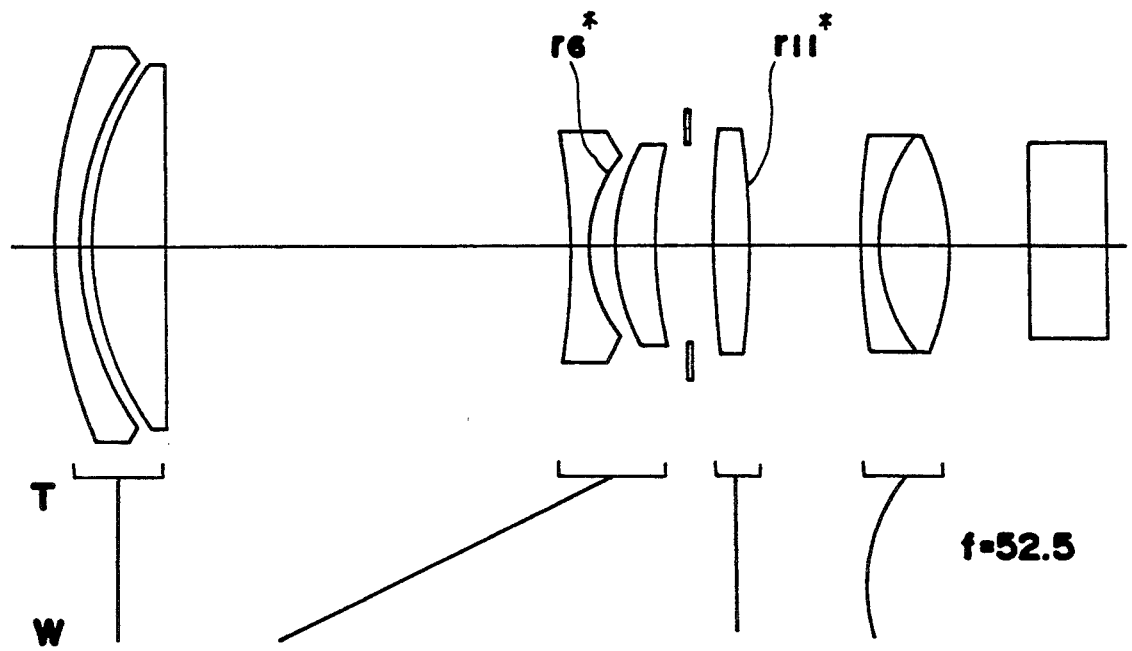
FIG. 5 represents a cross sectional view of the zoom lens system according to the fifth embodiment of the present invention in the longest focal length condition.
Figure 6:
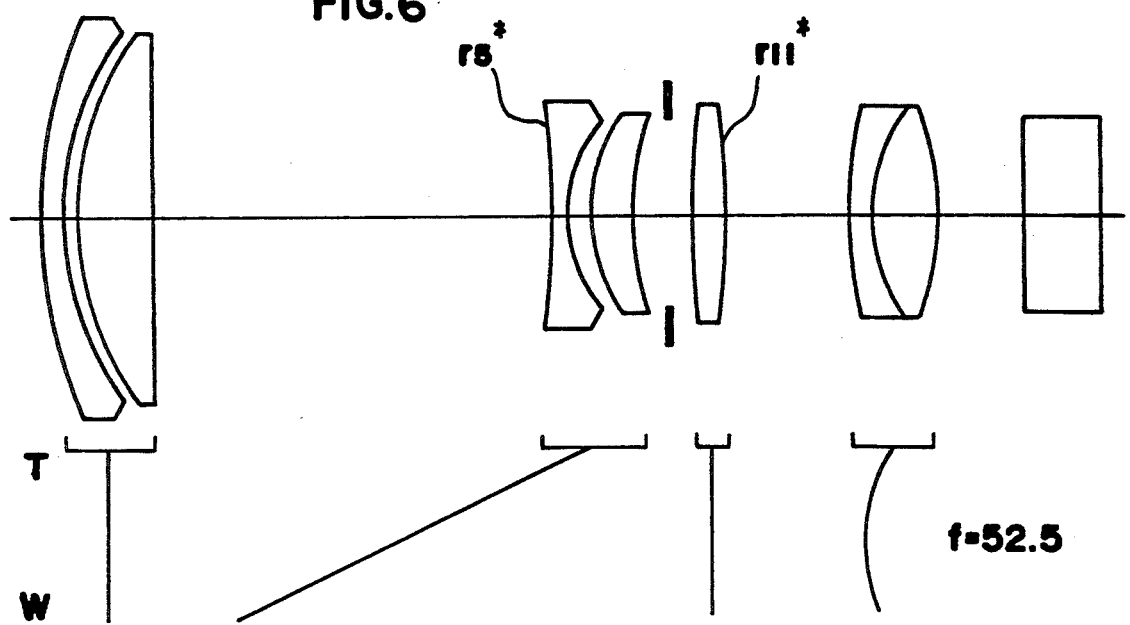
FIG. 6 represents a cross sectional view of the zoom lens system according to the sixth embodiment of the present invention in the longest focal length condition.
Figure 7:
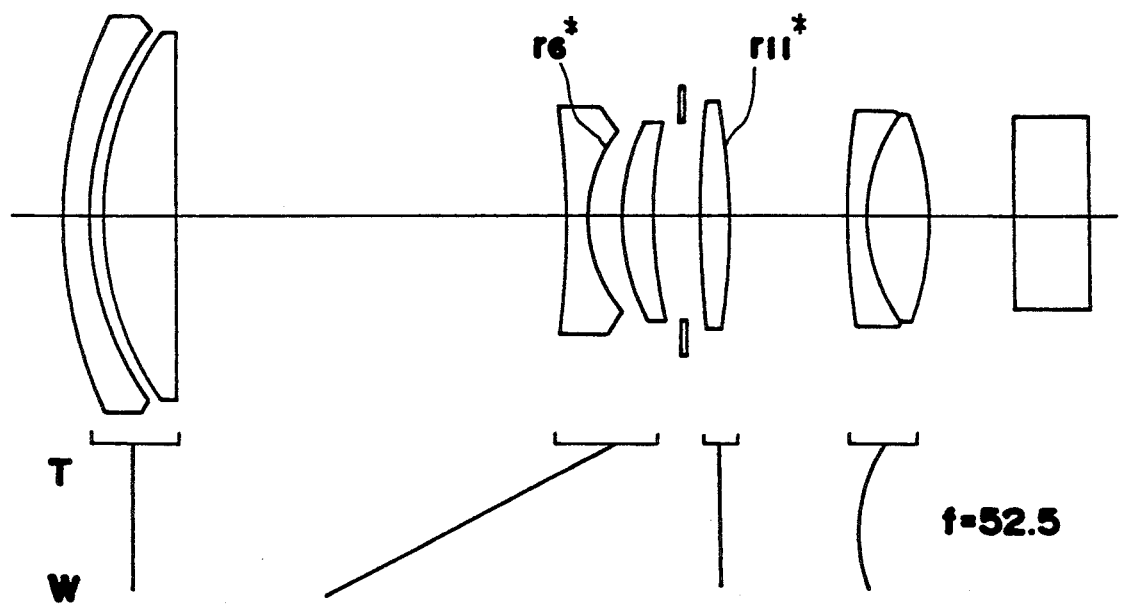
FIG. 7 represents a cross sectional view of the zoom lens system according to the seventh embodiment of the present invention in the longest focal length condition.
Figure 8:
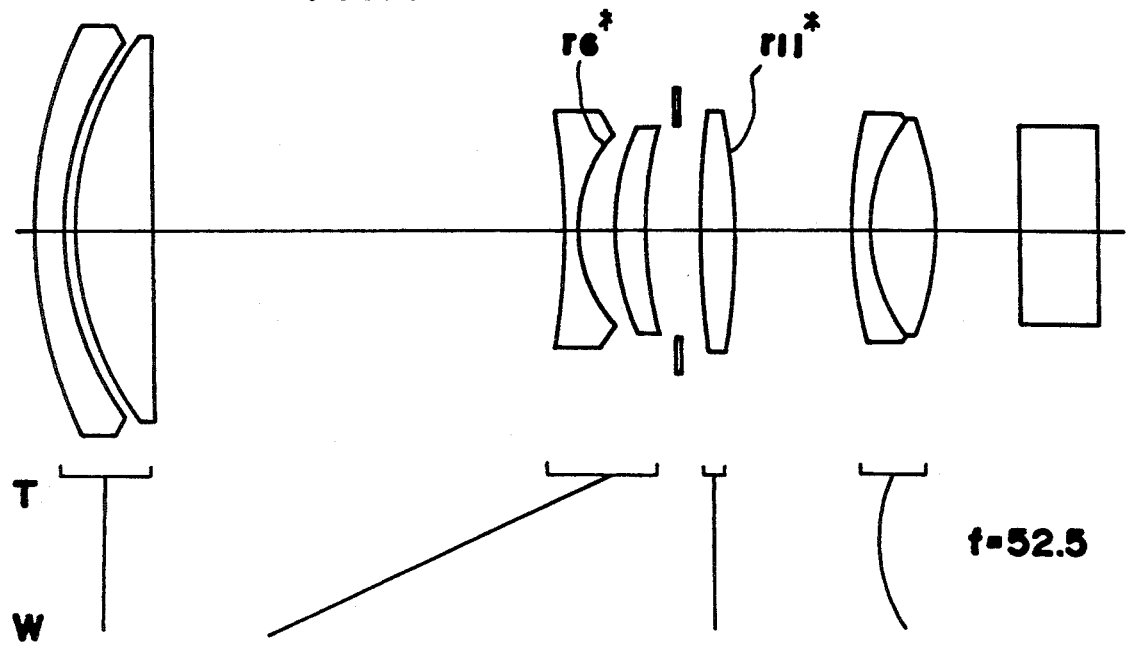
FIG. 8 represents a cross sectional view of the zoom lens system according to the eighth embodiment of the present invention in the longest focal length condition.
Figure 9:
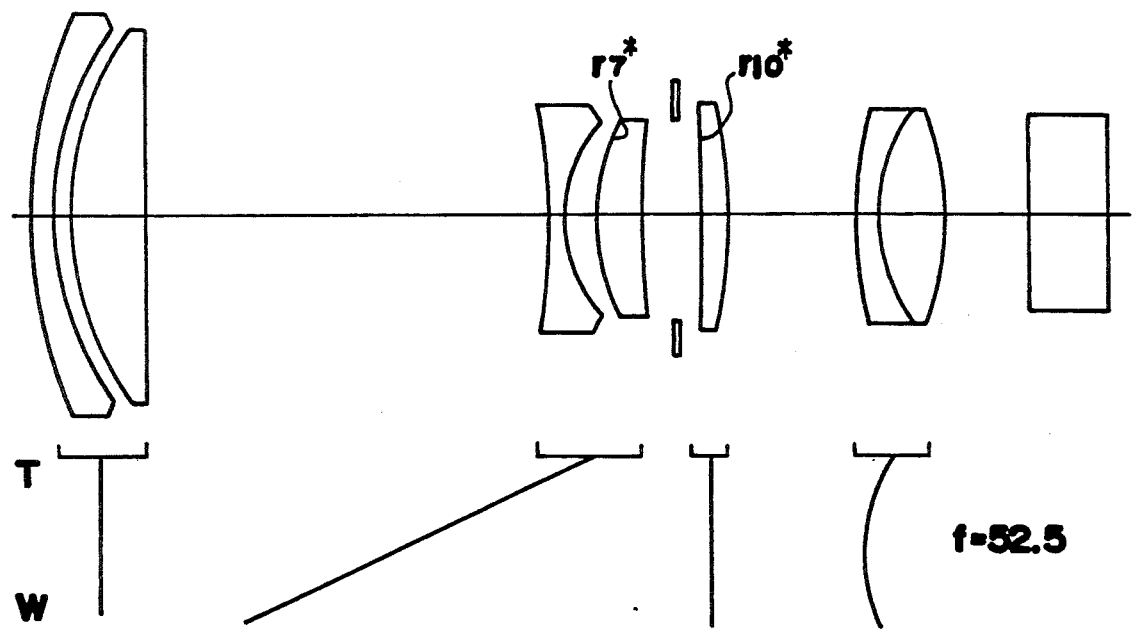
FIG. 9 represents a cross sectional view of the zoom lens system according to the nineth embodiment of the present invention in the longest focal length condition.
Figure 10:
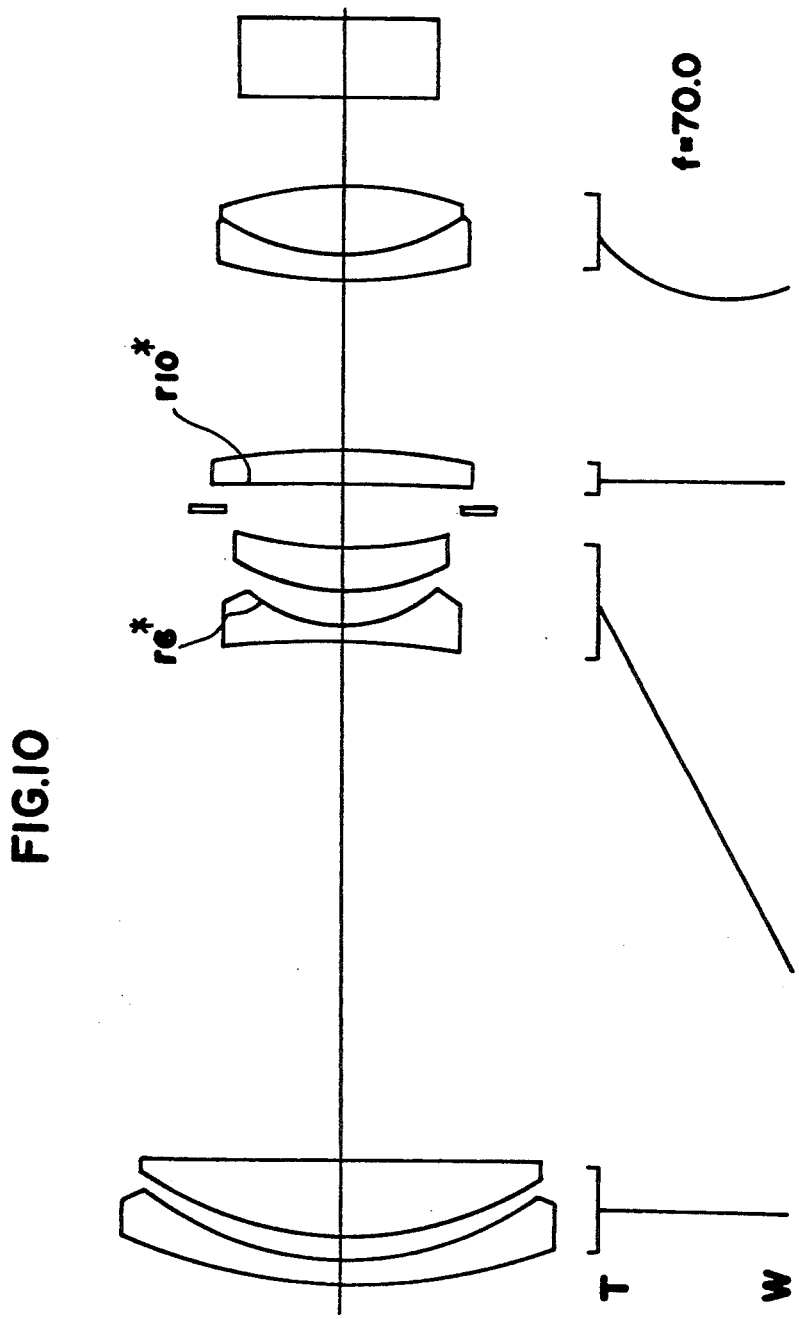
FIG. 10 represents a cross sectional view of the zoom lens system according to the tenth embodiment of the present invention in the longest focal length condition.
Figure 11:
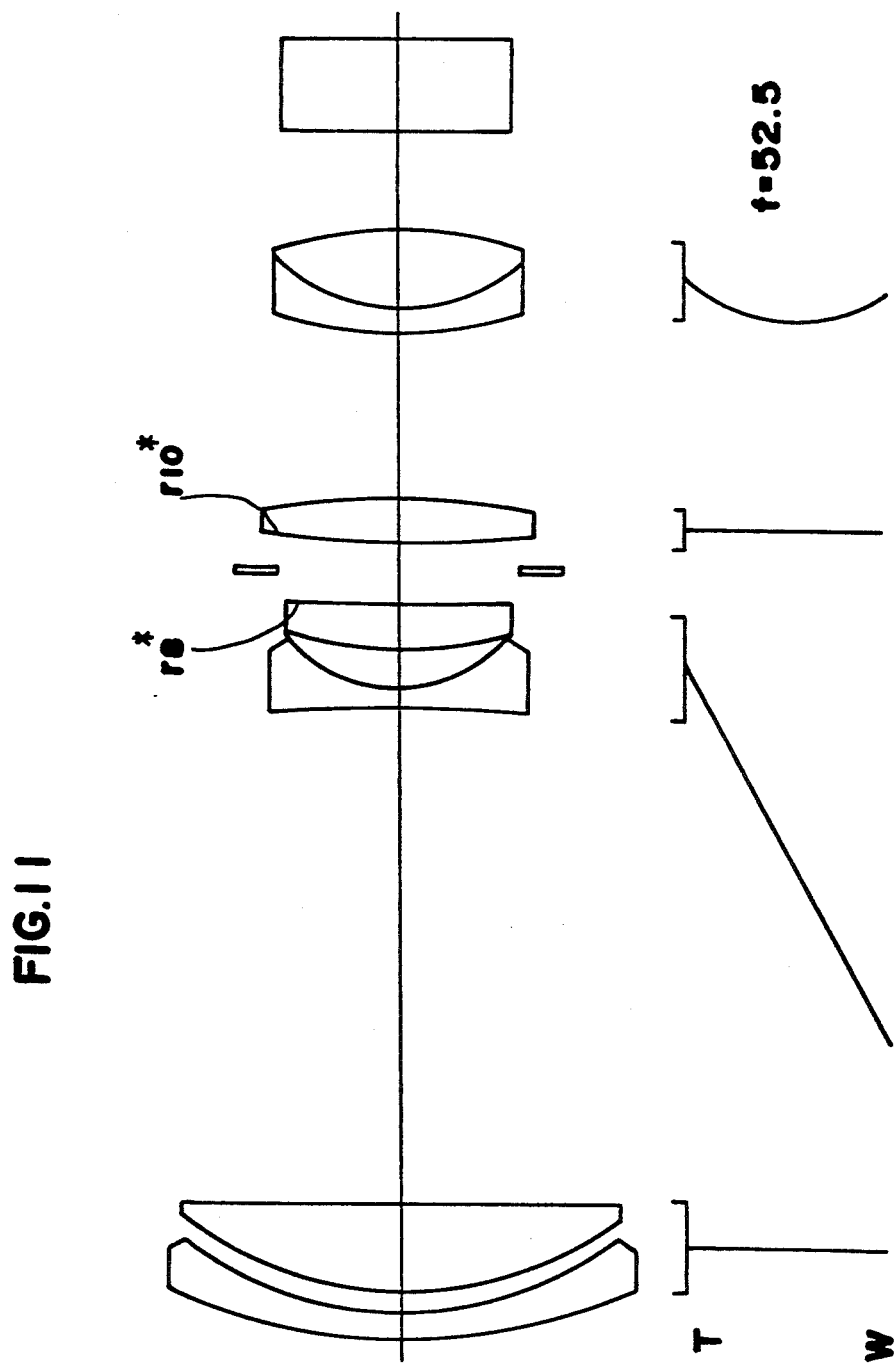
FIG. 11 represents a cross sectional view of the zoom lens system according to the eleventh embodiment of the present invention in the longest focal length condition.
Figure 12A:
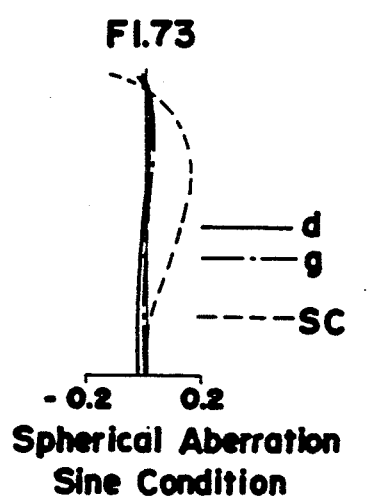
FIGS. 12a to 12c represent the aberration curves of the first embodiment in the longest focal length condition.
Figure 12B:
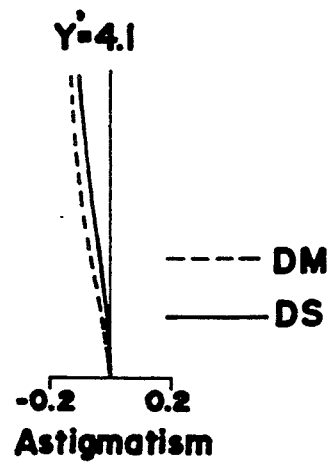
Figure 12C:
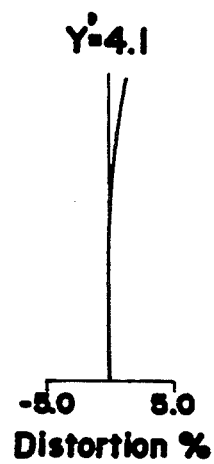
Figure 13A:
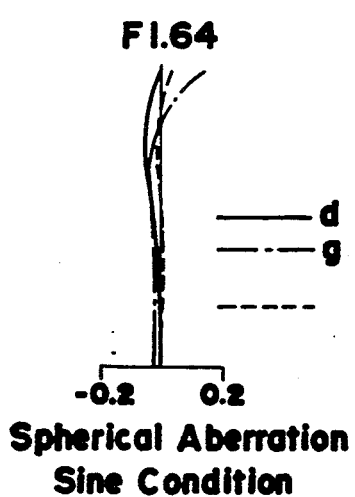
FIGS. 13a to 13c represent the aberration curves of the first embodiment in the medium focal length condition.
Figure 13B:
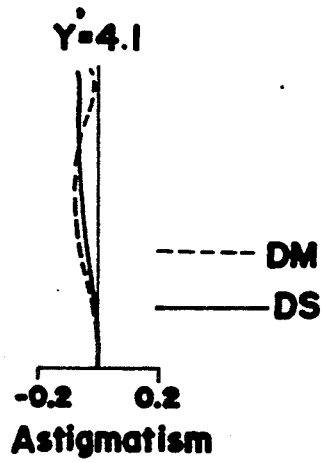
Figure 13C:
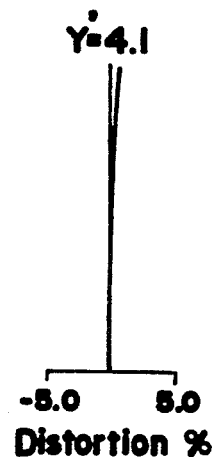
Figure 14A:
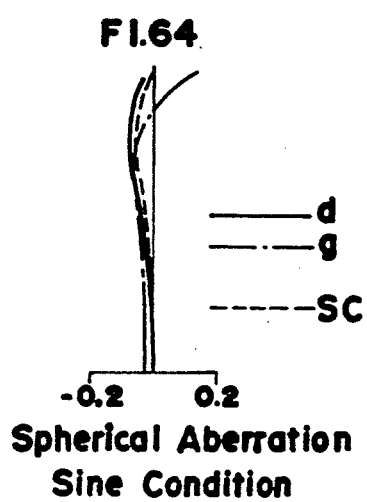
FIGS. 14a to 14c represent the aberration curves of the first embodiment in the shortest focal length condition.
Figure 14B:
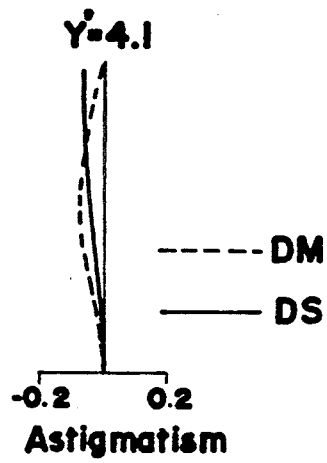
Figure 14C:
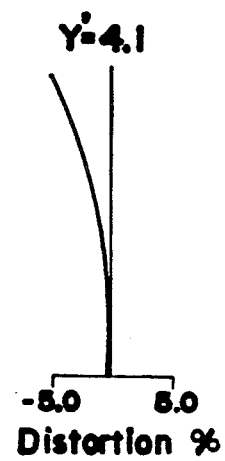
Figure 15A:
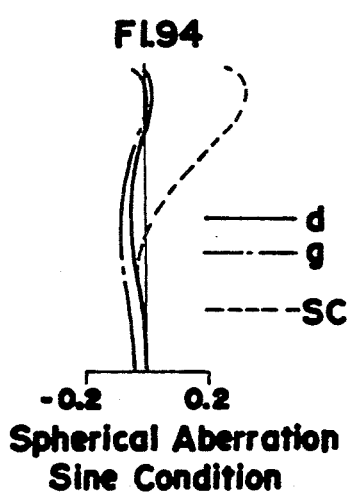
FIGS. 15a to 15c represent the aberration curves of the second embodiment in the longest focal length condition.
Figure 15B:
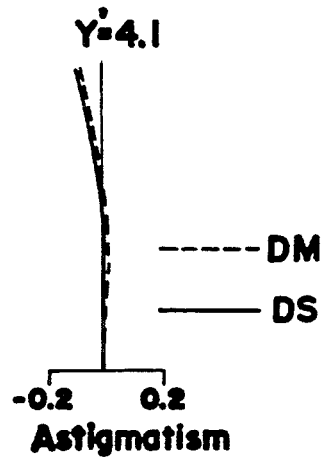
Figure 15C:
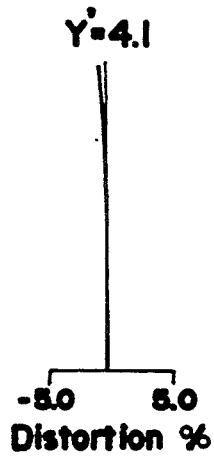
Figure 16A:
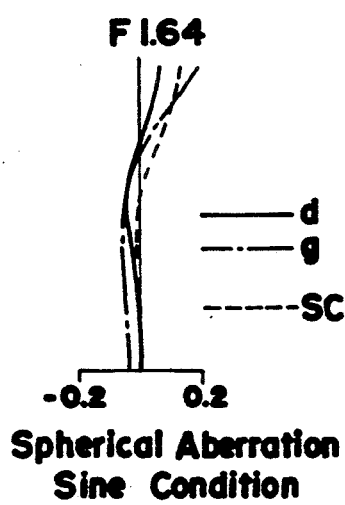
FIGS. 16a to 16c represent the aberration curves of the second embodiment in the medium focal length condition.
Figure 16B:
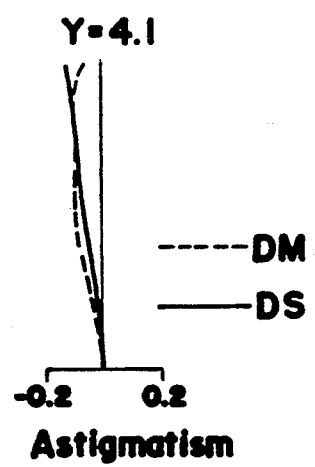
Figure 16C:
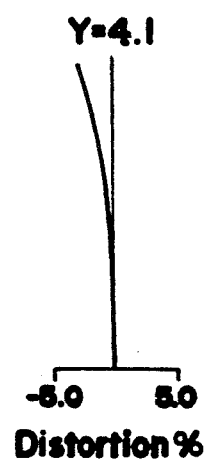
Figure 17A:
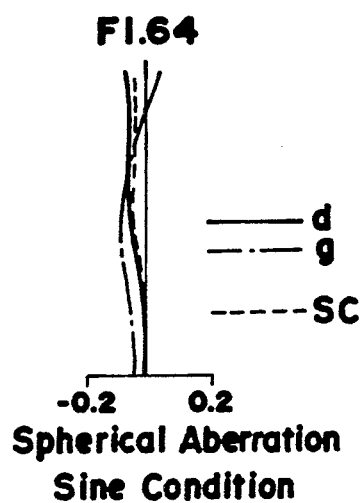
FIGS. 17a to 17c represent the aberration curves of the second embodiment in the shortest focal length condition.
Figure 17B:
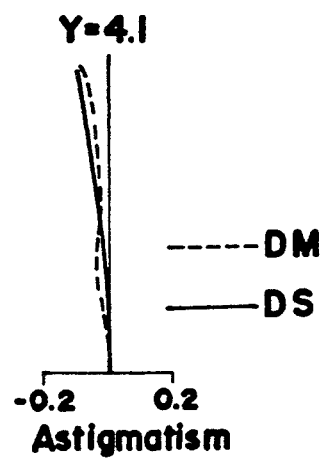
Figure 17C:
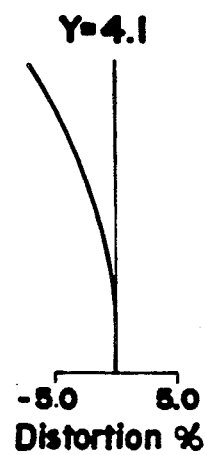
Figure 18A:
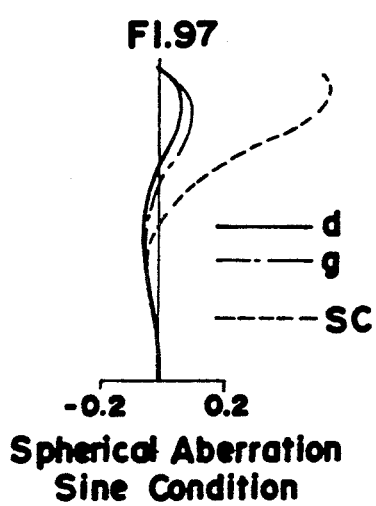
FIGS. 18a to 18c represent the aberration curves of the third embodiment in the longest focal length condition.
Figure 18B:
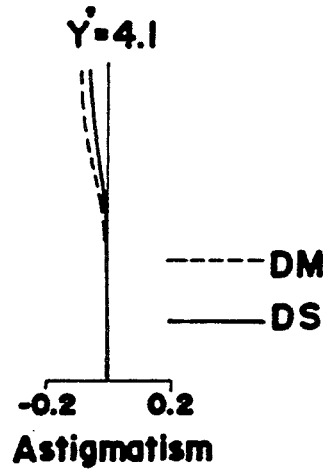
Figure 18C:
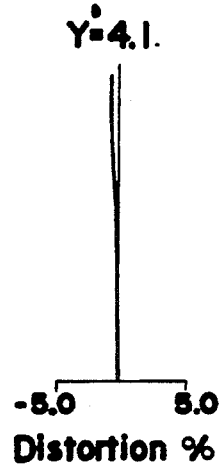
Figure 19A:
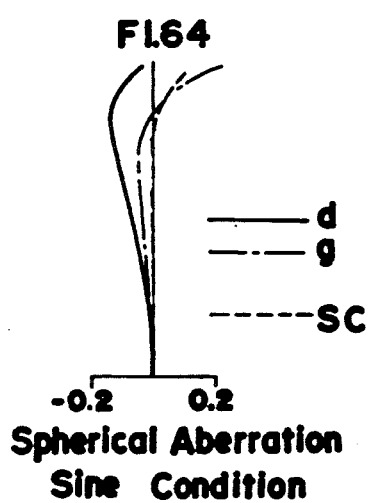
FIGS. 19a to 19c represent the aberration curves of the third embodiment in the medium focal length condition.
Figure 19B:
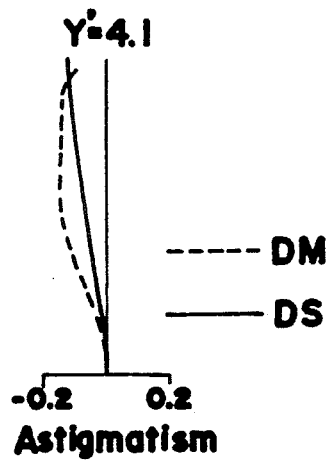
Figure 19C:
Figure 20A:
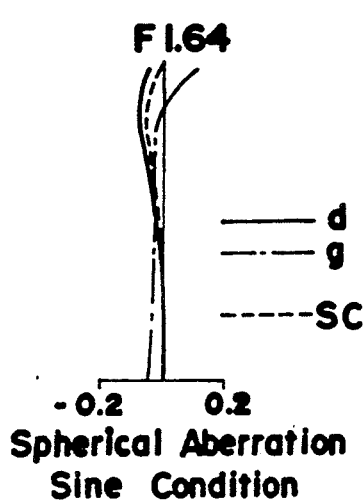
FIGS. 20a to 20c represent the aberration curves of the third embodiment in the shortest focal length condition.
Figure 20B:
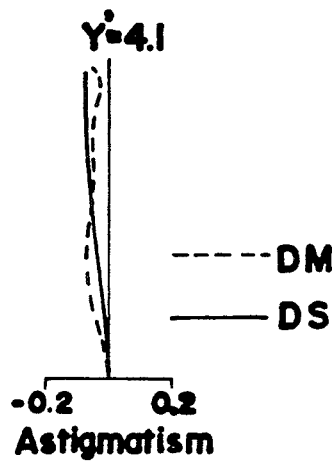
Figure 20C:
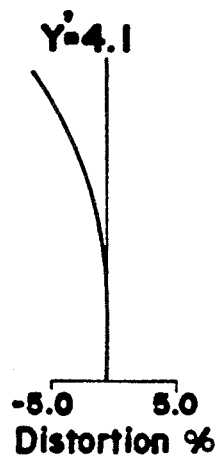
Figure 24A:
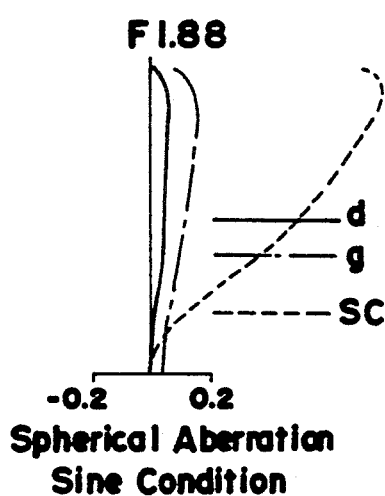
FIGS. 24a to 24c represent the aberration curves of the fifth embodiment in the longest focal length condition.
Figure 24B:
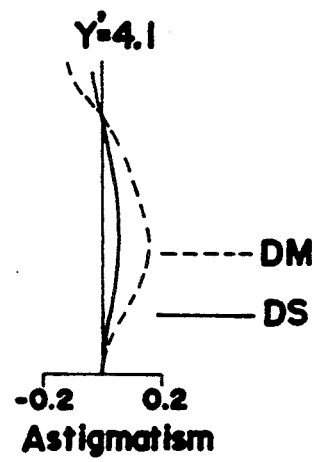
Figure 24C:
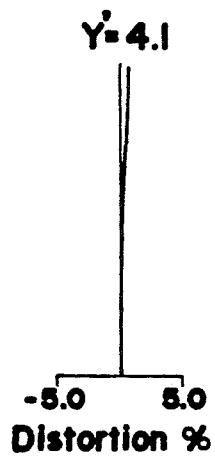
Figure 25A:
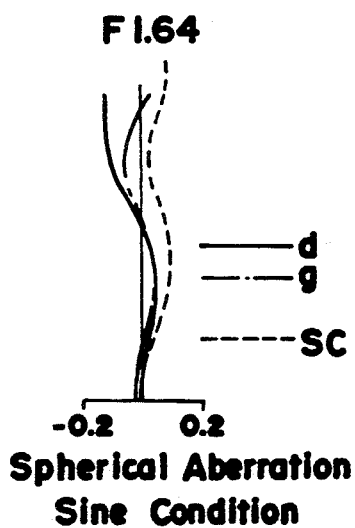
FIGS. 25a to 25c represent the aberration curves of the fifth embodiment in the medium focal length condition.
Figure 25B:
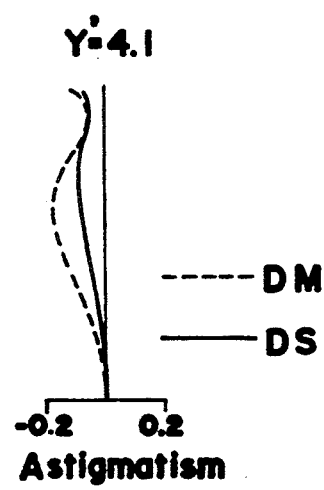
Figure 25C:
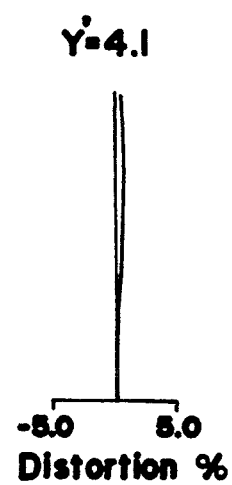
Figure 26A:
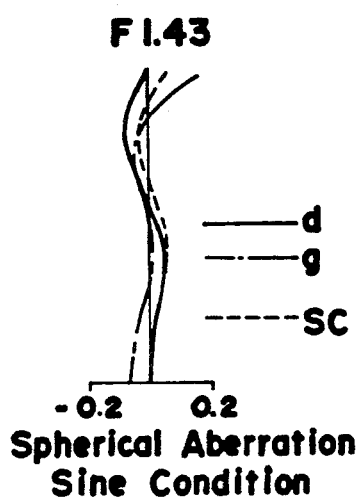
FIGS. 26a to 26c represent the aberration curves of the fifth embodiment in the shortest focal length condition.
Figure 26B:
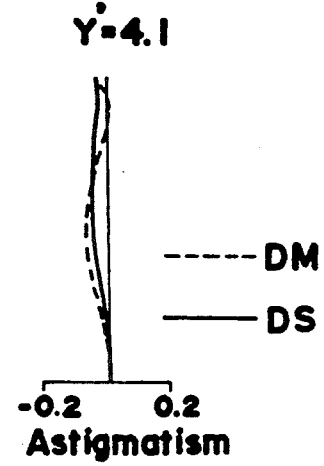
Figure 26C:
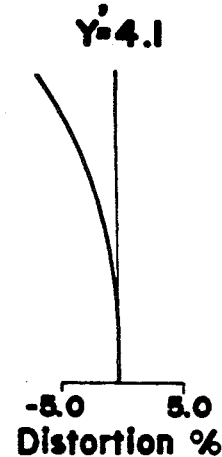
Figure 27A:
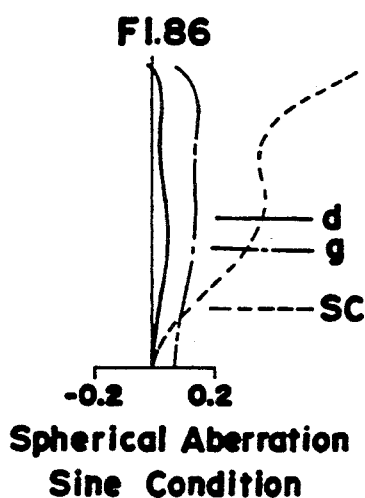
FIGS. 27a to 27c represent the aberration curves of the sixth embodiment in the longest focal length condition.
Figure 27B:
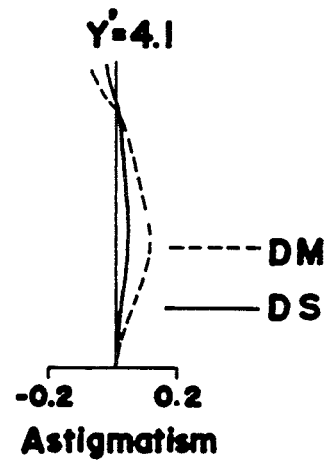
Figure 27C:
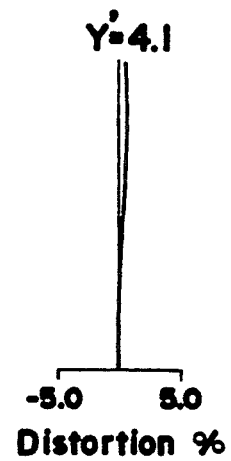
Figure 28A:
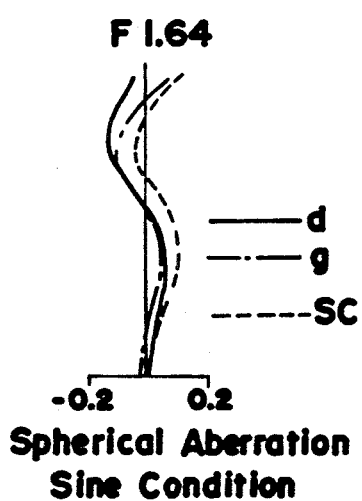
FIGS. 28a to 28c represent the aberration curves of the sixth embodiment in the medium focal length condition.
Figure 28B:
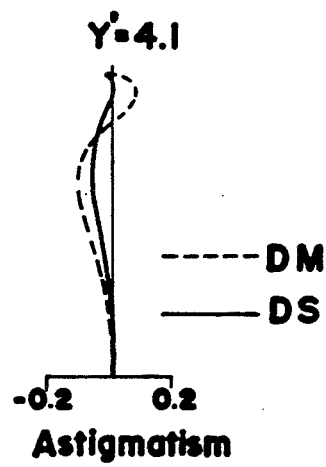
Figure 28C:
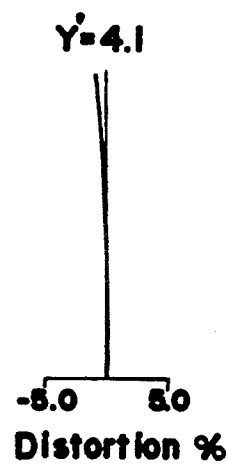
Figure 29A:
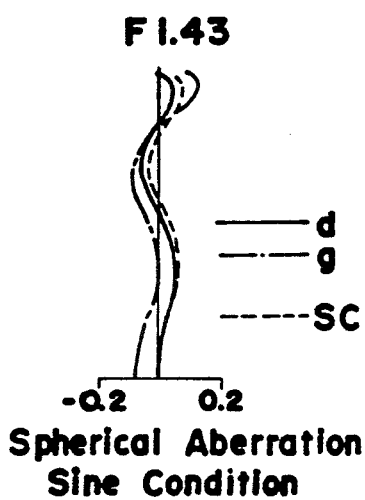
FIGS. 29a to 29c represent the aberration curves of the sixth embodiment in the shortest focal length condition.
Figure 29B:
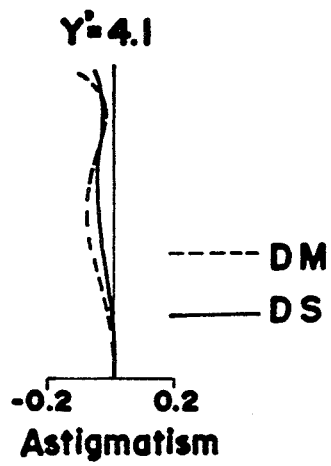
Figure 29C:
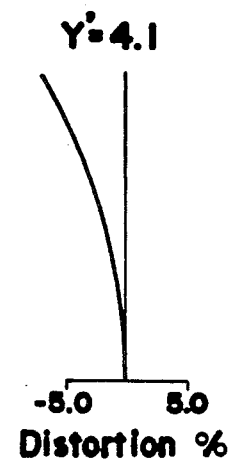
Figure 30A:
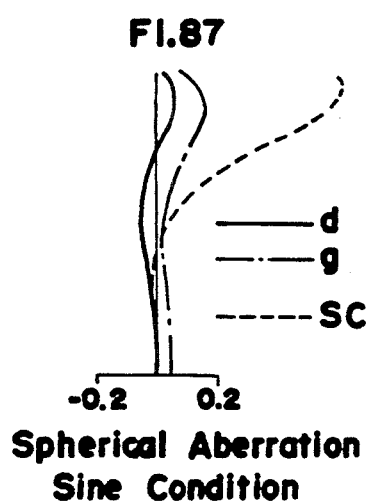
FIGS. 30a to 30c represent the aberration curves of the seventh embodiment in the longest focal length condition.
Figure 30B:
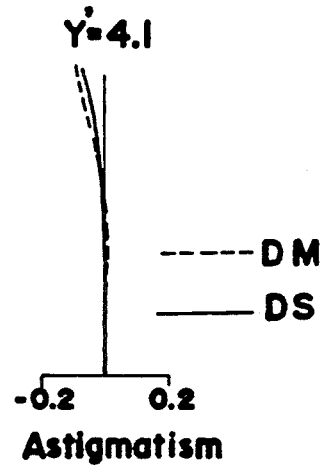
Figure 30C:
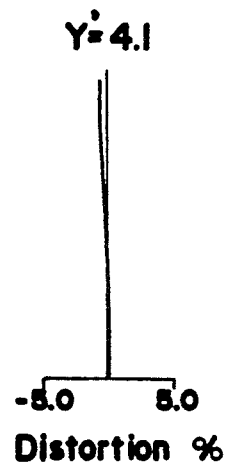
Figure 31A:
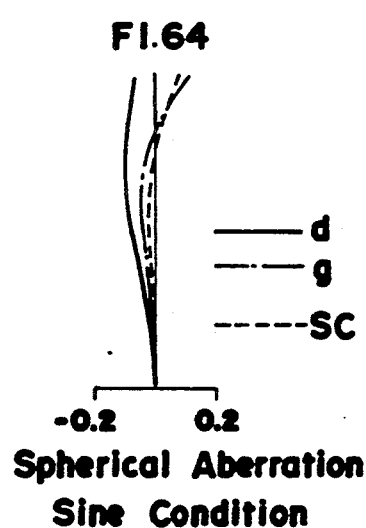
FIGS. 31a to 31c represent the aberration curves of the seventh embodiment in the medium focal length condition.
Figure 31B:
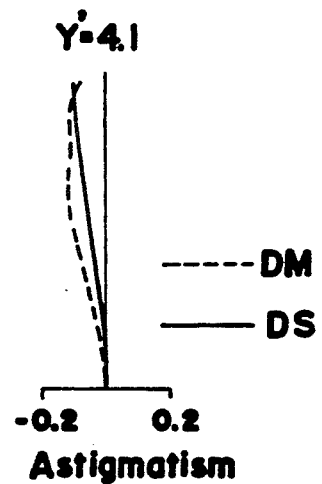
Figure 31C:
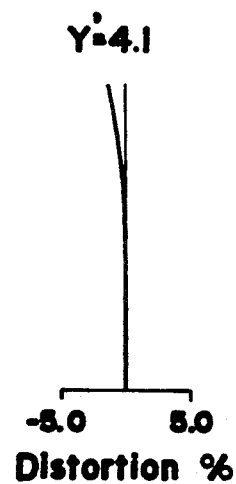
Figure 32A:
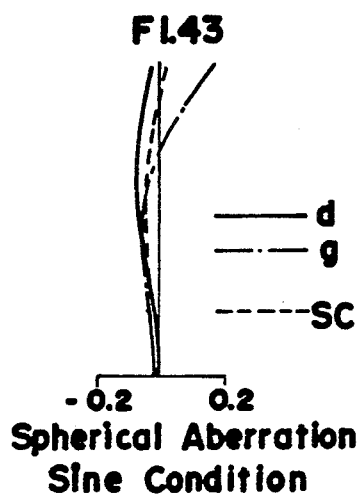
FIGS. 32a to 32c represent the aberration curves of the seventh embodiment in the shortest focal length condition.
Figure 32B:
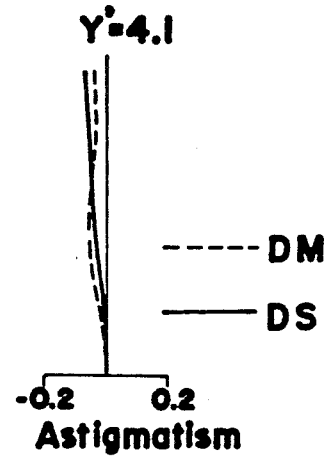
Figure 32C:
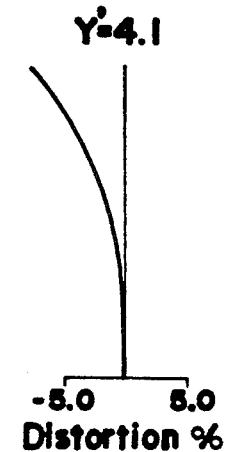
Figure 33A:
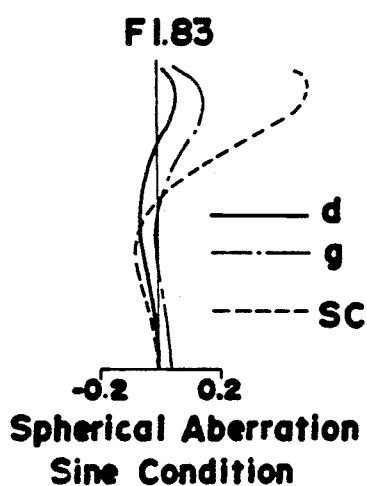
FIGS. 33a to 33c represent the aberration curves of the eighth embodiment in the longest focal length condition.
Figure 33B:
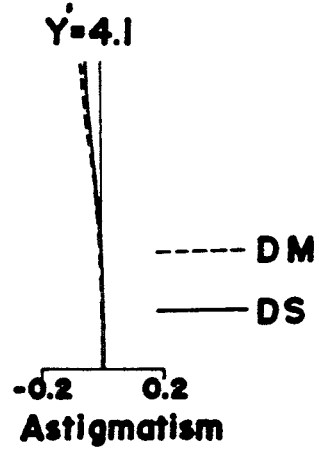
Figure 33C:
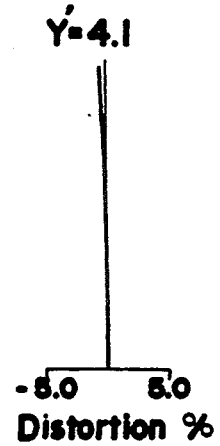
Figure 34A:
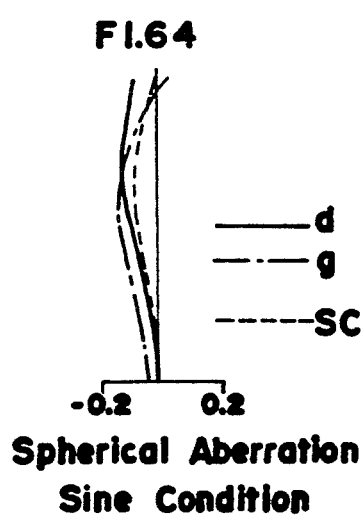
FIGS. 34a to 34c represent the aberration curves of the eighth embodiment in the medium focal length condition.
Figure 34B:
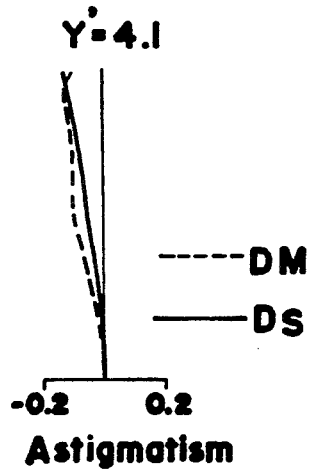
Figure 34C:
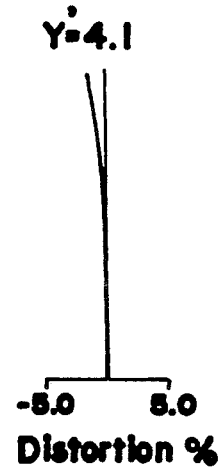
Figure 35A:
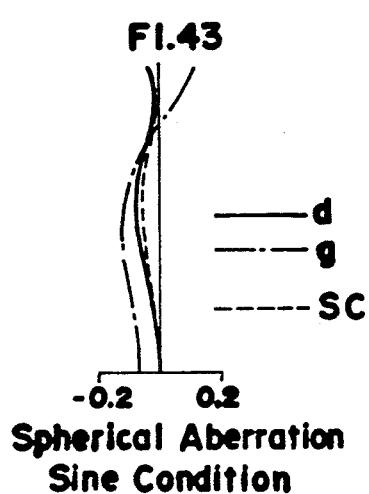
FIGS. 35a to 35c represent the aberration curves of the eighth embodiment in the shortest focal length condition.
Figure 35B:
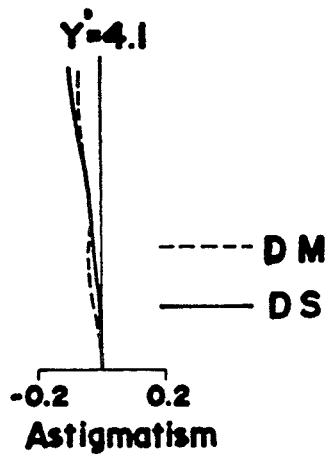
Figure 35C:
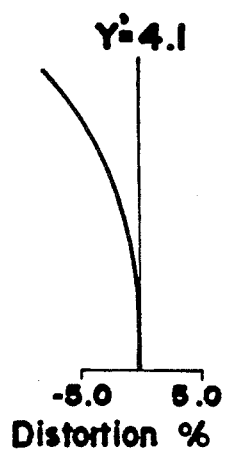
Figure 36A:
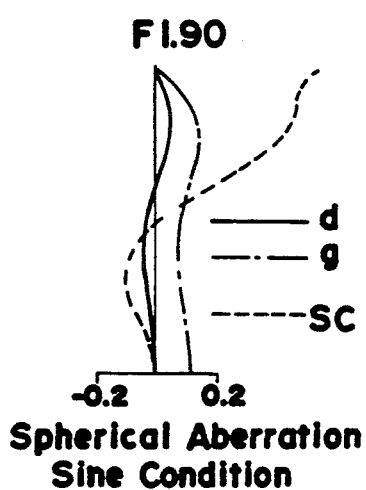
FIGS. 36a to 36c represent the aberration curves of the ninth embodiment in the longest focal length condition.
Figure 36B:
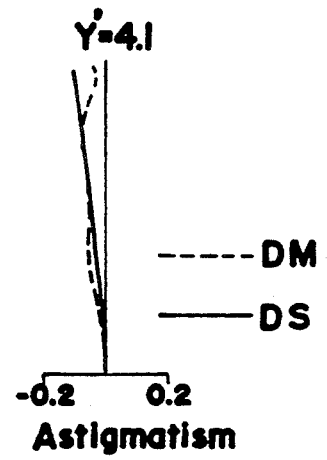
Figure 36C:
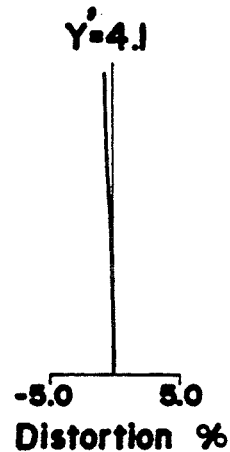
Figure 37A:
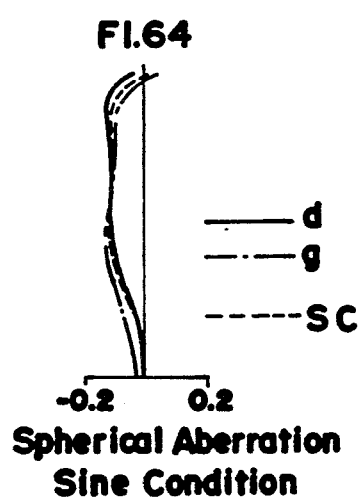
FIGS. 37a to 37c represent the aberration curves of the ninth embodiment in the medium focal length condition.
Figure 37B:
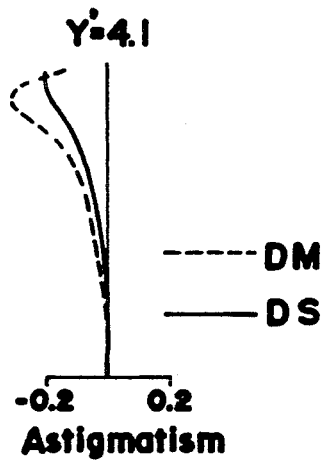
Figure 37C:
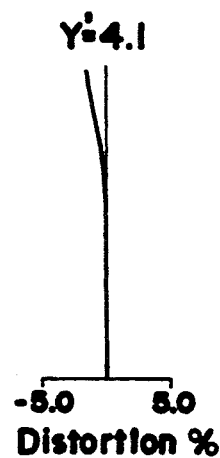
Figure 38A:
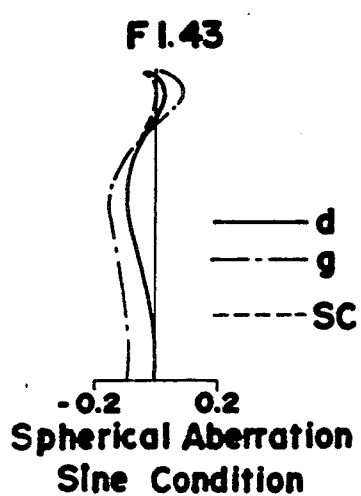
FIGS. 38a to 38c represent the aberration curves of the ninth embodiment in the shortest focal length condition.
Figure 38B:
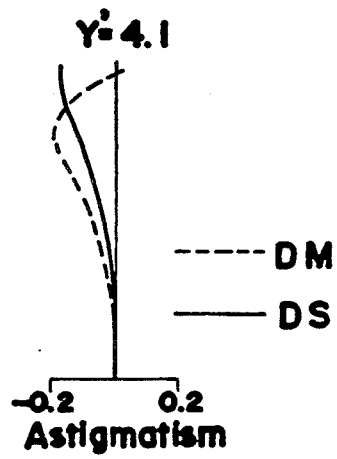
Figure 38C:
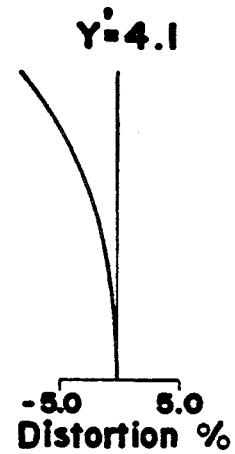
Figure 39A:
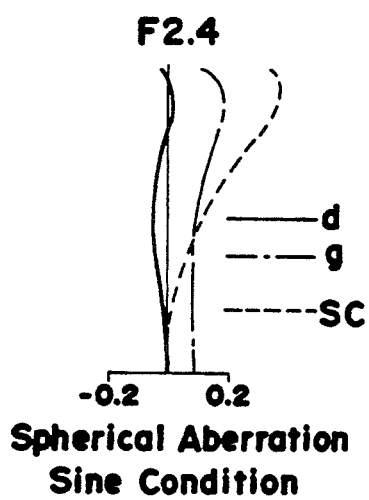
FIGS. 39a to 39c represent the aberration curves of the tenth embodiment in the longest focal length condition.
Figure 39B:
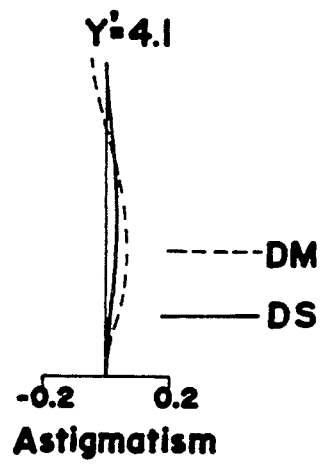
Figure 39C:
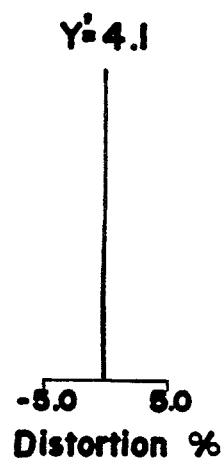
Figure 40:
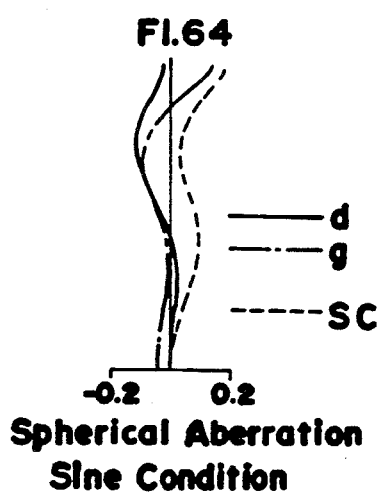
FIGS. 40a to 40c represent the aberration curves of the tenth embodiment in the medium focal length condition.
Figure 40:
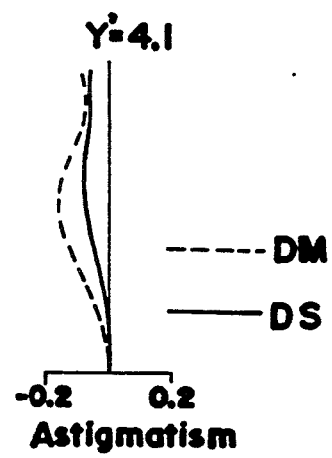
Figure 40:
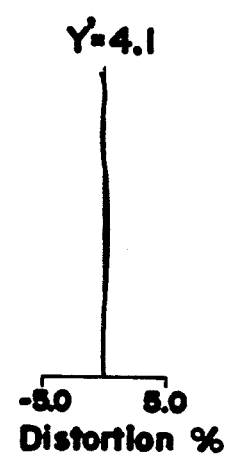
Figure 41A:
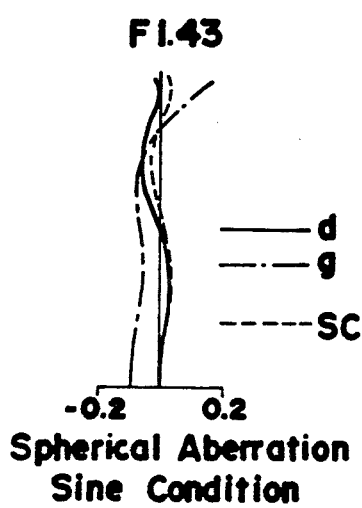
FIGS. 41a to 41c represent the aberration curves of the tenth embodiment in the shortest focal length condition.
Figure 41B:
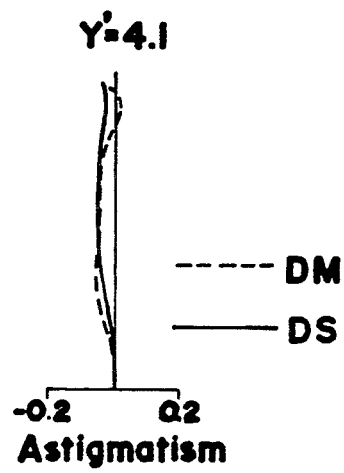
Figure 41C:
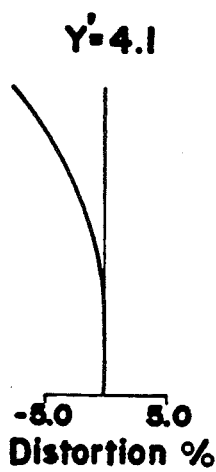
Figure 42A:
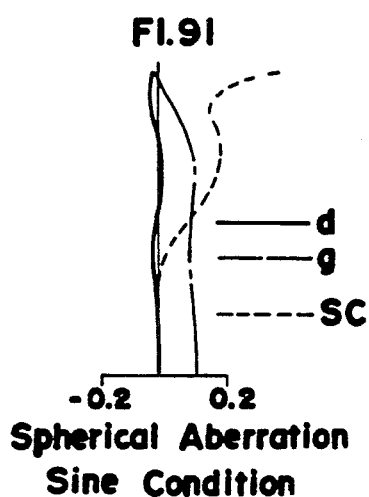
FIGS. 42a to 42c represent the aberration curves of the eleventh embodiment in the longest focal length condition.
Figure 42B:
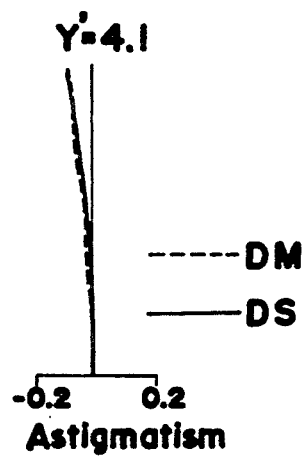
Figure 42C:
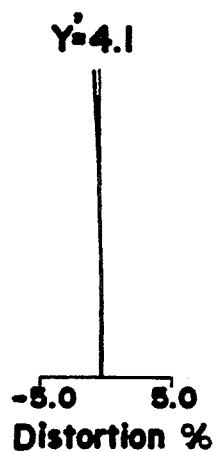
Figure 43A:
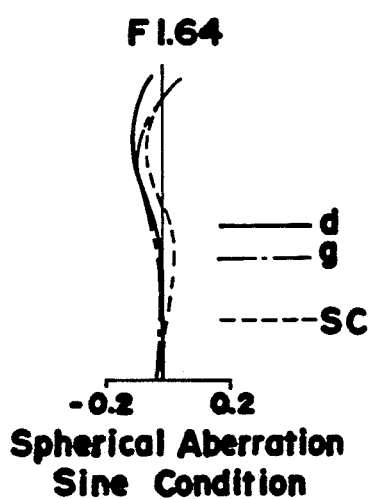
FIGS. 43a to 43c represent the aberration curves of the eleventh embodiment in the medium focal length condition.
Figure 43B:
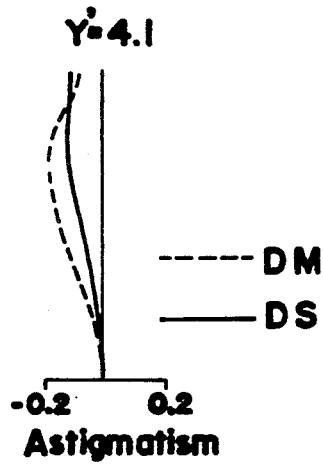
Figure 43C:
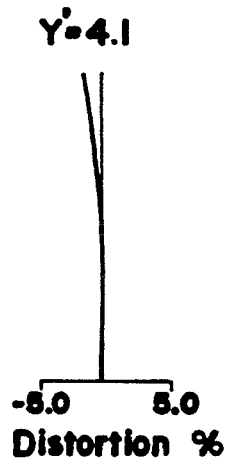
Figure 44A:
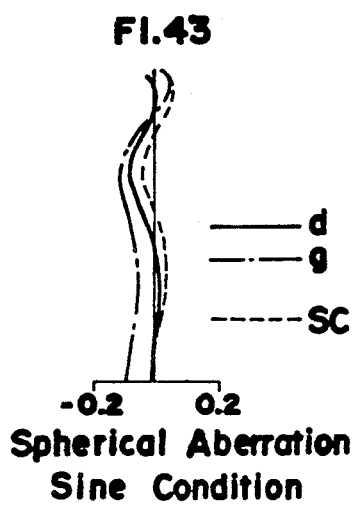
FIGS. 44a to 44c represent the aberration curves of the eleventh embodiment in the shortest focal length condition.
Figure 44B:
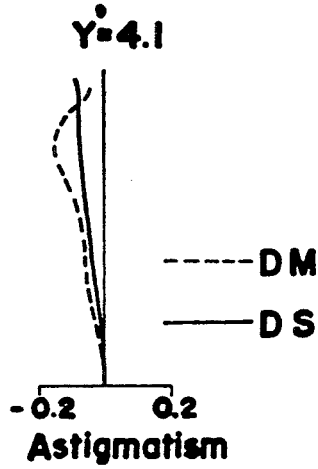
Figure 44C:
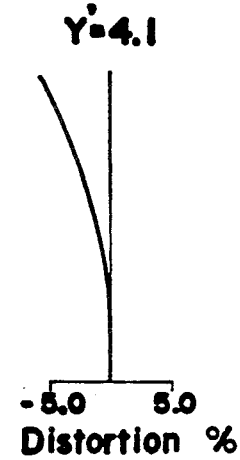

As shown in FIGS. 1 to 11, the present invention provides a zoom lens system comprising from the object side: a first lens unit (I) of a positive refractive power and consisting of, from the object side, a first negative meniscus lens element (L1) convex to the object side, a second positive lens element (L2), located at the image side of the first negative meniscus lens element (L1) with having an air space therebetween, having a stronger refractive surface on its object side surface; a second lens unit (II) of a negative refractive power and consisting of, from the object side, a third negative lens element (L3) having a stronger refractive surface on its image side surface, and a fourth positive lens element (L4), located at the image side of the third negative meniscus lens element (L3) with having an air space therebetween, said second lens unit (II) having an aspheric surface; a third lens unit (III) of a positive refractive power and consisting of a single positive lens element (L5) having an aspheric surface; and a fourth lens unit (IV) of a positive refractive power and including a positive lens element and a negative lens element; and the second lens unit (II) being shiftable in the zooming operation and at least one of the first, third and fourth lens units being also shiftable in the zooming operation.

In the present invention, it is desirable to fulfill the following conditions for well controlling the deterioration of the aberrations due to the zooming operation with keeping the simple construction of the first and second lens units both of which consists of only two lens elements, respectively and with achieving high zooming ratio;

(1) $0.21 < \phi I / |\phi II| < 0.39$ (2) $0.03 < AII/fw < 0.70$ (3) $0.55 < fM \cdot (n_2 - 1)/r_3 < 0.95$ (wherein $fM = (fW \cdot fT)^{\frac{1}{2}}$)

wherein, $\phi I$ represents a refractive power of the first lens unit (I); $\phi II$ represents a refractive power of the second lens unit (II); AII represents an axial thickness of an air lens element formed by the third negative lens element (L3) and the fourth positive lens element (L4) in the second lens unit (II); fW represents a focal length of the whole lens system in the shortest focal length condition; fT represents a focal length of the whole lens system in the longest focal length condition; ni represents a refractive index of the i-th lens element counted from the object side; and ri represents a radius of curvature of the i-th lens surface counted from the object side.

Condition (1) defines a proper ratio of the first and second lens units (I) and (II), both of which greatly influence the change of the aberrations in the zooming operation. If the lower limit of the condition (1) is violated, the aberrations generated in the second lens unit (II) can not be corrected well even if an aspheric surface is applied, although the lens system becomes more compact. Contrary, if the upper limit of the condition (1) is violated, the whole lens system becomes large since the diameter of the first lens element (L1) must be increased undesirably for maintaining the sufficient light amount on the marginal region on the image plane.

Condition (2) is effective for keeping the simple construction in which the second lens unit consists of only two lens elements. If the lower limit of the condition (2) is violated by closing both lens elements in the second lens unit with each other, the aberration correcting function served by the air lens element formed between the third lens element (L3) and the fourth lens element (L4) is deteriorated so that the aberrations can not be corrected well when the high zooming ratio is required. If the upper limit of the condition (2) is violated, a first height through which the main ray of the marginal light bundle passes in the third lens element is considerably diffferent from a second height through which such main ray passes in the fourth lens element, and therefore the longituidal chromatic aberration can not be corrected well when the high zooming ratio is required.

Condition (3) defines the proper range of the refractive power of the object side surface of the second lens element (L2), having a stronger refractive surface than its image side surface. If the upper limit or the lower limit of the condition (3) is violated, it becomes difficult to well correct the spherical aberration and the chromatic aberration generated mainly by the first lens unit (I) in the longest focal length condition.

In the present invention, it is also desirable to fulfill the following conditions;

(4) $0.15 < AIII\text{-}IV/fM < 0.75$
(wherein, $fM = (fW \cdot fT)^{\frac{1}{2}}$)
(5) $0.6 < \phi III/\phi I < 1.9$ wherein, AIII-IV represents an axial distance between the third lens unit (III) and the fourth lens unit (IV); and $\phi III$ represents a refractive power of the third lens unit (III).

Condition (4) defines the position of the fourth lens unit (IV) relative to the third lens unit (III), and is necessary for constructing the fourth lens unit (IV) by only two lens elements. The fourth lens unit of conventional positive-negative-positive-positive type four group zoom lens system comprises four (4) to six (6) lens elements. If the lower limit of the condition (4) is violated by locating the fourth lens unit (IV) nearby the third lens unit (III), the aberrations in marginal region on the image plane cannot be corrected well since the height through which the marginal light passes in the fourth lens unit (IV) becomes too small, although the total length of the whole lens system can be reduced.

Condition (5) defines the ratio of the refractive power of the third lens unit (III) to that of the first lens unit (I). If the lower limit of the condition (5) is violated by excessively increasing the positive refractive power of the first lens unit (I), the diameter of the the first lens element (L1) becomes undesirably large, although the shifting distance of the second lens unit (II) in the zooming operation can be reduced. Contrary, if the upper limit of the condition (5) is violated by excessively increasing the positive refractive power of the third lens unit (III), the back focal distance of the whole lens system becomes insufficient or the proper field curvature cannot be maintained due to the increase of Pezval sum.

In the present invention, it is desirable for making the lens system more compact, that the fourth lens unit (IV) consists of one negative lens element and one positive lens element cemented with each other. In such construction, it is further desirable to fulfill the following conditions;

(6) $-2.1 < fM \cdot (1-n_3)/r_6 < -1.3$
(7) $0 < \phi IVP/\phi IVR < 1.5$
(wherein, $\phi IVP = (n_6-1)/r_{12}$, and $\phi IVR = (1-n_7)/r_{14}$)

wherein, ni represents a refractive index of the i-th lens element counted from the object side; ri represents a radius of curvature of the i-th lens surface counted from the object side with including the aperture diaphram; $\phi IVP$ represents a refractive power of the object side surface of the fourth lens unit (IV) as defined above; and $\phi IVR$ represents a refractive power of the image side surface of the fourth lens unit (IV) as defined above.

Condition (6) defines a proper range of the refractive power of the image side surface of the third lens element (L3) in the second lens unit (II). If the lower or upper limit of the condition (6) is violated, it becomes difficult to well correct the spherical aberration and the comatic aberration generated mainly in the second lens unit (II) in the longest focal length condition, and also to well correct the distortion and the comatic aberration in the shortest focal length condition.

Condition (7) defines the balance of the refractive power in the fourth lens unit (IV) consisting of cemented lens elements. In the present invention, the image side surface of the fourth lens unit (IV) is most effective for correcting the aberrations in the marginal region. It is desirable to mainly correct the field curvature by the image side surface of the fourth lens unit (IV) and to over-correct the spherical aberration by the aspheric surface in the third lens unit (III). Therefore, if the lower limit of the condition (7) is violated, it becomes difficult to correct the spherical aberration well. On the other hand, if the upper limit of the condition (7) is violated, the field curvature becomes undesirably positive.

It is effective, in the present invention, that said fourth positive lens element (L4) in the second lens unit (II) is a positive meniscus lens element having a stronger refractive power on its object side surface, and that said lens system further fulfills the following conditions:

(8) $0.30 < r_6/r_7 < 0.90$
(9) $0.4 < \phi IIIR/\phi III < 2.2$
(wherein $\phi IIIR = (1-n_5)/r_{11}$)

wherein, $\phi IIIR$ represents a refractive power of the image side surface of the third lens unit (III), and defined as shown above.

Condition (8) defines the shape of the air lens element formed by the image side surface of the third lens element (L3) and the object side surface of the fourth lens element (L4) in the second lens unit (II), in order to cancel the aberrations generated in the second lens unit (II) with each other therein. If the lower or upper limit of the condition (8) is violated, the undesirable extreme change of the aberrations caused by the zooming operation can not be controlled.

Condition (9) defines the balance of the refractive power in the third lens unit (III) consisting of a single lens element, and means that relatively large refractive power should be applied to the image side surface of the single lens element. Such power balance in the third lens unit (III) is desirable for decreasing the spherical aberration generated by the third lens unit (III) since the third lens unit (III) converges the incident diverging light bundle into almost parallel light bundle. The spherical aberration can be corrected considerably by applying an aspheric surface in the third lens unit (III). However, if the lower limit of the condition (9) is violated by increasing the refractive power of the image side surface of the single lens element, the comatic aberration is considerably generated. If the upper limit of the condition (9) is violated by decreasing the refractive power of the image side surface of the single lens element, it becomes difficult to actually manufacture the aspheric surface effective for correcting the aberrations.

Next, the shifting of the first, third or fourth lens unit in the zooming operation is explained. It is well known to increase the number of lens units, being shifted in the zooming operation, for making the whole lens system more compact and for well correcting the aberrations. However, it is desirable to decrease the number of lens units, being shifted in the zooming operation, for making the construction of the lens barrel more simple. In the embodiments described below, only either one of the first lens unit (I) and the fourth lens unit (IV) is shifted in the zooming operation for correcting the aberrations generated by the shifting of the second lens unit (II) for changing the focal length of the whole lens system. In the embodiments shown below, the first lens unit (I) is shiftable in the zooming operation with the shifting of the second lens unit (II) in the first embodiment (Embodiment 1), while the fourth lens unit (IV) is shiftable in the zooming operation with the shifting of the second lens unit (II) in the second to eleventh embodiments (Embodiments 2 to 11).

It will be explained below with respect to the application of aspheric surface. In the embodiments shown below, the aspheric surface having a following shape is applied. Namely, if the aspheric surface is applied to a lens element having the same sign of the refractive power as the sign of the refractive power of the lens unit including such applied lens element, the shape of such aspheric surface is defined to monotonously decrease the refractive power of the surface in accordance with the increase of height measured from the optical axis. Contrary, if the aspheric surface is applied to a lens element having the opposite sign of the refractive power to the sign of the refractive power of the lens unit including such applied lens element, the shape of such aspheric surface is defined to monotonously increase the refractive power of the surface in accordance with the increase of the height. For example, in the second lens unit (II) having the negative refractive power, the aberration generated by the third negative lens element (L3) is excessively large. Therefore, if the aspheric surface is applied to the third negative lens element (L3) in the second lens unit (II) having the negative refractive power, its shape should be defined to decrease the refractive power in accordance with the increase of the height in order to cancel the aberrations generated by the third negative lens element (L3) with that by the fourth positive lens element (L4) each other. Contrary, if the aspheric surface is applied to the fourth positive lens element (L4) in the second lens unit (II) having the negative refractive power, its shape should be defined to increase the refractive power in accordance with the increase of the height in order to cancel the aberrations generated by the fourth positive lens element (L4) with that by the third negative lens element (L3) each other. In the present invention, it is effective for well correcting the aberrations to apply the aspheric surface to the second lens unit (II), to the third lens unit (III), or to both of them.

In the embodiments disclosed below, an aperture diaphragm is represented as having an infinite radius of curvature (INF). In the embodiments, the aperture diaphragm is located between the second lens unit (II) and the third lens unit (III) with being stationary in the zooming operation.

The following TABLES 1 to 11 disclose, respectively, the first through eleventh embodiments of the present invention. In the TABLES, f represents a focal length of the zoom lens system according to the present invention, F represents an F-number, $r_1, r_2, \ldots$ represent radii of curvature with respective sub numbers indicating the surface from the object to image side along the optical axis including the aperture diaphragm, $d_1, d_2 \ldots$ represent the axial distances and include both air spaces and actual thicknesses of the lenses along the optical axis, $n_1, n_2, \ldots$ represent the refractive indexes of respective lenses and again, the sub numbers refer to particular optical elements from the object to image side, and $\nu_1, \nu_2, \ldots$ represent Abbe numbers of respective lenses sequentially counted from the object side. In all of the embodiments disclosed below, a plane optical plate, corresponding to a low-pass filter or a face plate, is located at the image side of the fourth lens unit (IV).

In TABLES 1 to 11, the asterisk (*) indicates the aspheric surface which is defined by the following equation for deviation $X_0$ from the osculating spherical surface having the radius of curvature r in the X-axis parallel to the optical axis, with the direction in which light advances being taken as positive;

$$X_0 = (h^2/r)/[1+(1-\epsilon h^2/r^2)^{\frac{1}{2}}] + \Sigma A i h$$

wherein, h represents a height measured from the optical axis; Ai represent the aspheric surface coefficients of i-th order; and $\epsilon$ represents a conic coefficient.

TABLE 12 represents the refractive powers of the first to third lens units and the longest, medium, and shortest focal lengths of the whole lens system. TABLE 13 represents the relation between all of the disclosed embodiments and the conditions.

Although the present invention has fully been described in connection with the preferred embodiments thereof with reference to the accompanying drawings, it is to be noted that various changes and modifications are apparent to those skilled in the art. Such changes and modifications are to be understood as being included within the scope for the present invention as defined by appended claims.

TABLE 1
(Embodiment 1)

| radius of curvature | axial distance | refractive index | Abbe number |
|---|---|---|---|
| $r_1$ 26.870 | | | |
| | $d_1$ 1.500 | $n_1$ 1.84666 | $v_1$ 23.83 |
| $r_2$ 17.513 | | | |
| | $d_2$ 1.300 | | |
| $r_3$ 19.302 | | | |
| | $d_3$ 5.000 | $n_2$ 1.71300 | $v_2$ 53.93 |
| $r_4$ −198.263 | | | |
| | $d_4$ 16.386 − 8.947 − 2.000 | | |
| $r_5$ −47.619 | | | |
| | $d_5$ 1.000 | $n_3$ 1.77250 | $v_3$ 49.77 |
| $r_6$* 8.403 | | | |
| | $d_6$ 1.900 | | |
| $r_7$ 11.995 | | | |
| | $d_7$ 2.800 | $n_4$ 1.84666 | $v_4$ 23.83 |
| $r_8$ 21.251 | | | |
| | $d_8$ 3.200 − 15.310 − 19.233 | | |
| $r_9$ INF | | | |
| | $d_9$ 2.200 | | |
| $r_{10}$* −36.115 | | | |
| | $d_{10}$ 3.400 | $n_5$ 1.77250 | $v_5$ 49.77 |
| $r_{11}$ −15.833 | | | |
| | $d_{11}$ 4.600 | | |
| $r_{12}$ 213.858 | | | |
| | $d_{12}$ 2.800 | $n_6$ 1.84666 | $v_6$ 23.83 |
| $r_{13}$ 16.582 | | | |
| | $d_{13}$ 4.800 | $n_7$ 1.71300 | $v_7$ 53.93 |
| $r_{14}$ −15.312 | | | |
| | $d_{14}$ 5.000 | | |
| $r_{15}$ INF | | | |
| | $d_{15}$ 8.600 | $n_8$ 1.51680 | $v_8$ 64.20 |
| $r_{16}$ INF | | | |

$f = 29.6 - 15.0 - 10.27$
$F = 1.73 - 1.64 - 1.64$
Aspheric surface coefficients:
*$r_6$: $\epsilon = 0.1000 \times 10$
$A_4 = -0.12133 \times 10^{-3}$
$A_6 = -0.66114 \times 10^{-6}$
$A_8 = -0.31080 \times 10^{-7}$
*$r_{10}$: $\epsilon = 0.10000 \times 10$
$A_4 = -0.12770 \times 10^{-3}$
$A_6 = -0.88962 \times 10^{-9}$
$A_8 = -0.16502 \times 10^{-7}$

TABLE 2
(Embodiment 2)

| radius of curvature | axial distance | refractive index | Abbe number |
|---|---|---|---|
| $r_1$ 29.070 | | | |
| | $d_1$ 1.500 | $n_1$ 1.84666 | $v_1$ 23.83 |
| $r_2$ 18.215 | | | |
| | $d_2$ 1.300 | | |
| $r_3$ 19.368 | | | |
| | $d_3$ 4.400 | $n_2$ 1.77250 | $v_2$ 49.77 |
| $r_4$ 507.916 | | | |
| | $d_4$ 22.240 − 8.358 − 2.000 | | |
| $r_5$ −166.667 | | | |
| | $d_5$ 1.000 | $n_3$ 1.77250 | $v_3$ 49.77 |
| $r_6$* 8.621 | | | |
| | $d_6$ 1.800 | | |
| $r_7$ 10.914 | | | |
| | $d_7$ 2.700 | $n_4$ 1.84666 | $v_4$ 23.83 |
| $r_8$ 15.534 | | | |
| | $d_8$ 2.600 − 16.483 − 22.840 | | |
| $r_9$ INF | | | |
| | $d_9$ 2.000 | | |
| $r_{10}$* −43.609 | | | |
| | $d_{10}$ 2.500 | $n_5$ 1.77250 | $v_5$ 49.77 |
| $r_{11}$ −22.664 | | | |
| | $d_{11}$ 7.300 − 4.870 − 5.395 | | |
| $r_{12}$ 30.009 | | | |
| | $d_{12}$ 1.600 | $n_6$ 1.84666 | $v_6$ 23.83 |
| $r_{13}$ 12.306 | | | |
| | $d_{13}$ 4.600 | $n_7$ 1.71300 | $v_7$ 53.93 |
| $r_{14}$ −20.635 | | | |
| | $d_{14}$ 5.000 − 7.430 − 6.905 | | |
| $r_{15}$ INF | | | |
| | $d_{15}$ 8.600 | $n_8$ 1.51680 | $v_8$ 64.20 |
| $r_{16}$ INF | | | |

$f = 39.0 - 15.0 - 10.27$
$F = 1.94 - 1.64 - 1.64$
Aspheric surface coefficients:
*$r_6$: $\epsilon = 0.1000 \times 10$
$A_4 = -0.72502 \times 10^{-4}$
$A_6 = 0.88352 \times 10^{-6}$
$A_8 = -0.36552 \times 10^{-7}$
*$r_{10}$: $\epsilon = 0.10000 \times 10$
$A_4 = -0.54744 \times 10^{-4}$
$A_6 = -0.51139 \times 10^{-6}$
$A_8 = 0.19014 \times 10^{-8}$

TABLE 3
(Embodiment 3)

| radius of curvature | axial distance | refractive index | Abbe number |
|---|---|---|---|
| $r_1$ 35.336 | | | |
| | $d_1$ 1.700 | $n_1$ 1.84666 | $v_1$ 23.83 |
| $r_2$ 21.978 | | | |
| | $d_2$ 1.900 | | |
| $r_3$ 23.754 | | | |
| | $d_3$ 5.900 | $n_2$ 1.77250 | $v_2$ 49.77 |
| $r_4$ 984.659 | | | |
| | $d_4$ 31.561 − 16.404 − 2.000 | | |
| $r_5$ −56.180 | | | |
| | $d_5$ 1.100 | $n_3$ 1.77250 | $v_3$ 49.77 |
| $r_6$* 9.852 | | | |
| | $d_6$ 4.600 | | |
| $r_7$ 20.512 | | | |
| | $d_7$ 2.000 | $n_4$ 1.84666 | $v_4$ 23.83 |
| $r_8$ 41.367 | | | |
| | $d_8$ 2.100 − 17.257 − 31.661 | | |
| $r_9$ INF | | | |
| | $d_9$ 1.700 | | |
| $r_{10}$* −98.838 | | | |
| | $d_{10}$ 2.600 | $n_5$ 1.77250 | $v_5$ 49.77 |
| $r_{11}$ −41.688 | | | |
| | $d_{11}$ 10.700 − 7.641 − 9.294 | | |
| $r_{12}$ 57.913 | | | |
| | $d_{12}$ 1.300 | $n_6$ 1.84666 | $v_6$ 23.83 |
| $r_{13}$ 14.404 | | | |
| | $d_{13}$ 4.700 | $n_7$ 1.71300 | $v_7$ 53.93 |
| $r_{14}$ −23.100 | | | |
| | $d_{14}$ 7.000 − 10.059 − 8.406 | | |
| $r_{15}$ INF | | | |
| | $d_{15}$ 6.000 | $n_8$ 1.51680 | $v_8$ 64.20 |
| $r_{16}$ INF | | | |

$f = 52.5 - 19.0 - 9.28$
$F = 1.97 - 1.64 - 1.64$
Aspheric surface coefficients:
*$r_6$: $\epsilon = -0.22815 \times 10$
$A_4 = 0.29195 \times 10^{-3}$
$A_6 = -0.14455 \times 10^{-5}$
$A_8 = -0.25552 \times 10^{-9}$
*$r_{10}$: $\epsilon = -0.47511 \times 10^2$
$A_4 = -0.25784 \times 10^{-4}$
$A_6 = 0.87098 \times 10^{-8}$
$A_8 = 0.72676 \times 10^{-9}$

TABLE 4
(Embodiment 4)

| radius of curvature | axial distance | refractive index | Abbe number |
|---|---|---|---|
| $r_1$ 38.590 | | | |
| | $d_1$ 1.800 | $n_1$ 1.84666 | $v_1$ 23.83 |
| $r_2$ 23.368 | | | |
| | $d_2$ 1.300 | | |
| $r_3$ 24.663 | | | |
| | $d_3$ 6.000 | $n_2$ 1.77250 | $v_2$ 49.77 |
| $r_4$ 733.105 | | | |
| | $d_4$ 33.539 − 17.203 − 2.000 | | |
| $r_5$ −84.911 | | | |
| | $d_5$ 1.100 | $n_3$ 1.77250 | $v_3$ 49.77 |
| $r_6$* 9.846 | | | |
| | $d_6$ 2.300 | | |

TABLE 4-continued (Embodiment 4)

| radius of curvature | axial distance | refractive index | Abbe number |
|---|---|---|---|
| $r_7$ 14.435 | | | |
| | $d_7$ 3.600 | $n_4$ 1.84666 | $v_4$ 23.83 |
| $r_8$ 24.741 | | | |
| | $d_8$ 3.300 − 19.367 − 34.839 | | |
| $r_9$ INF | | | |
| | $d_9$ 2.200 | | |
| $r_{10}$* −5982.289 | | | |
| | $d_{10}$ 3.000 | $n_5$ 1.77250 | $v_5$ 49.77 |
| $r_{11}$ −32.723 | | | |
| | $d_{11}$ 9.300 − 6.483 − 7.883 | | |
| $r_{12}$ 53.511 | | | |
| | $d_{12}$ 1.700 | $n_6$ 1.84666 | $v_6$ 23.83 |
| $r_{13}$ 15.402 | | | |
| | $d_{13}$ 5.500 | $n_7$ 1.71300 | $v_7$ 53.93 |
| $r_{14}$ −21.669 | | | |
| | $d_{14}$ 7.000 − 9.817 − 8.417 | | |
| $r_{15}$ INF | | | |
| | $d_{15}$ 6.000 | $n_8$ 1.51680 | $v_8$ 64.20 |
| $r_{16}$ INF | | | |

$f = 52.5 - 19.0 - 9.28$
$F = 1.87 - 1.64 - 1.43$
Aspheric surface coefficients:
*$r_6$: $\epsilon = 0.10000 \times 10$
$A_4 = -0.80315 \times 10^{-4}$
$A_6 = 0.30674 \times 10^{-6}$
$A_8 = -0.21362 \times 10^{-7}$
$A_{10} = 0.12817 \times 10^{-9}$
$A_{12} = -0.90410 \times 10^{-12}$
*$r_{10}$: $\epsilon = 0.10000 \times 10$
$A_4 = -0.47601 \times 10^{-4}$
$A_6 = 0.71711 \times 10^{-6}$
$A_8 = -0.27900 \times 10^{-7}$
$A_{10} = 0.41035 \times 10^{-9}$
$A_{12} = -0.22528 \times 10^{-11}$

TABLE 5

(Embodiment 5)

| radius of curvature | axial distance | refractive index | Abbe number |
|---|---|---|---|
| $r_1$ 41.667 | | | |
| | $d_1$ 1.800 | $n_1$ 1.84666 | $v_1$ 23.83 |
| $r_2$ 23.981 | | | |
| | $d_2$ 1.300 | | |
| $r_3$ 25.401 | | | |
| | $d_3$ 6.000 | $n_2$ 1.77250 | $v_2$ 49.77 |
| $r_4$ −1191.696 | | | |
| | $d_4$ 33.978 − 17.464 − 1.999 | | |
| $r_5$ −54.168 | | | |
| | $d_5$ 1.000 | $n_3$ 1.77250 | $v_3$ 49.77 |
| $r_6$* 9.816 | | | |
| | $d_6$ 2.400 | | |
| $r_7$ 15.942 | | | |
| | $d_7$ 3.300 | $n_4$ 1.84666 | $v_4$ 23.83 |
| $r_8$ 34.513 | | | |
| | $d_8$ 3.000 − 19.514 − 34.979 | | |
| $r_9$ INF | | | |
| | $d_9$ 2.000 | | |
| $r_{10}$* 52.632 | | | |
| | $d_{10}$ 3.300 | $n_5$ 1.77250 | $v_5$ 49.77 |
| $r_{11}$ −63.458 | | | |
| | $d_{11}$ 9.200 − 6.580 − 8.200 | | |
| $r_{12}$ 46.159 | | | |
| | $d_{12}$ 1.700 | $n_6$ 1.84666 | $v_6$ 23.83 |
| $r_{13}$ 13.526 | | | |
| | $d_{13}$ 5.500 | $n_7$ 1.71300 | $v_7$ 53.93 |
| $r_{14}$ −24.477 | | | |
| | $d_{14}$ 7.000 − 9.620 − 8.000 | | |
| $r_{15}$ INF | | | |
| | $d_{15}$ 6.000 | $n_8$ 1.51680 | $v_8$ 64.20 |
| $r_{16}$ INF | | | |

$f = 52.5 - 19.0 - 9.28$
$F = 1.88 - 1.64 - 1.43$
Aspheric surface coefficients:
*$r_6$: $\epsilon = 0.10000 \times 10$
$A_4 = -0.10573 \times 10^{-3}$
$A_6 = 0.39421 \times 10^{-7}$
$A_8 = -0.16250 \times 10^{-7}$
$A_{10} = 0.58215 \times 10^{-11}$
$A_{12} = -0.12366 \times 10^{-12}$
*$r_{11}$: $\epsilon = 0.10000 \times 10$
$A_4 = 0.40670 \times 10^{-4}$
$A_6 = -0.72951 \times 10^{-6}$
$A_8 = 0.1855 \times 10^{-7}$
$A_{10} = -0.21079 \times 10^{-9}$
$A_{12} = -0.93874 \times 10^{-12}$

TABLE 6

(Embodiment 6)

| radius of curvature | axial distance | refractive index | Abbe number |
|---|---|---|---|
| $r_1$ 40.516 | | | |
| | $d_1$ 1.800 | $n_1$ 1.84666 | $v_1$ 23.83 |
| $r_2$ 23.602 | | | |
| | $d_2$ 1.300 | | |
| $r_3$ 24.894 | | | |
| | $d_3$ 6.200 | $n_2$ 1.77250 | $v_2$ 49.77 |
| $r_4$ 5632.847 | | | |
| | $d_4$ 33.856 − 17.439 − 2.000 | | |
| $r_5$* −41.757 | | | |
| | $d_5$ 1.000 | $n_3$ 1.77250 | $v_3$ 49.77 |
| $r_6$ 11.170 | | | |
| | $d_6$ 2.300 | | |
| $r_7$ 15.567 | | | |
| | $d_7$ 3.200 | $n_4$ 1.84666 | $v_4$ 23.83 |
| $r_8$ 28.405 | | | |
| | $d_8$ 3.000 − 19.417 − 34.856 | | |
| $r_9$ INF | | | |
| | $d_9$ 2.000 | | |
| $r_{10}$ 77.449 | | | |
| | $d_{10}$ 3.000 | $n_5$ 1.77250 | $v_5$ 49.77 |
| $r_{11}$* −46.134 | | | |
| | $d_{11}$ 10.300 − 7.703 − 9.273 | | |
| $r_{12}$ 44.364 | | | |
| | $d_{12}$ 1.700 | $n_6$ 1.84666 | $v_6$ 23.83 |
| $r_{13}$ 13.732 | | | |
| | $d_{13}$ 5.500 | $n_7$ 1.71300 | $v_7$ 53.93 |
| $r_{14}$ −24.092 | | | |
| | $d_{14}$ 7.000 − 9.597 − 8.027 | | |
| $r_{15}$ INF | | | |
| | $d_{15}$ 6.000 | $n_8$ 1.51680 | $v_8$ 64.20 |
| $r_{16}$ INF | | | |

$f = 52.5 - 19.0 - 9.28$
$F = 1.86 - 1.64 - 1.43$
Aspheric surface coefficients:
*$r_5$: $\epsilon = 0.10000 \times 10$
$A_4 = 0.63391 \times 10^{-4}$
$A_6 = -0.57723 \times 10^{-6}$
$A_8 = 0.13923 \times 10^{-7}$
$A_{10} = -0.20292 \times 10^{-9}$
$A_{12} = 0.11097 \times 10^{-11}$
*$r_{11}$: $\epsilon = 0.10000 \times 10$
$A_4 = 0.43682 \times 10^{-4}$
$A_6 = -0.93706 \times 10^{-6}$
$A_8 = 0.22915 \times 10^{-7}$
$A_{10} = -0.21944 \times 10^{-9}$
$A_{12} = 0.71231 \times 10^{-12}$

TABLE 7

(Embodiment 7)

| radius of curvature | axial distance | refractive index | Abbe number |
|---|---|---|---|
| $r_1$ 37.547 | | | |
| | $d_1$ 1.800 | $n_1$ 1.84666 | $v_1$ 23.83 |
| $r_2$ 22.870 | | | |
| | $d_2$ 1.300 | | |
| $r_3$ 24.162 | | | |

TABLE 7-continued
(Embodiment 7)

| radius of curvature | axial distance | refractive index | Abbe number |
|---|---|---|---|
| $r_4$ 487.593 | | | |
| | $d_3$ 6.000 | $n_2$ 1.77250 | $v_2$ 49.77 |
| $r_5$ −62.999 | $d_4$ 33.841 − 17.447 − 2.001 | | |
| | $d_5$ 1.000 | $n_3$ 1.77250 | $v_3$ 49.77 |
| $r_6^*$ 9.821 | | | |
| | $d_6$ 3.200 | | |
| $r_7$ 17.131 | | | |
| | $d_7$ 2.700 | $n_4$ 1.84666 | $v_4$ 23.82 |
| $r_8$ 35.146 | | | |
| | $d_8$ 2.700 − 19.094 − 34.540 | | |
| $r_9$ INF | | | |
| | $d_9$ 1.800 | | |
| $r_{10}$ 67.178 | | | |
| | $d_{10}$ 3.100 | $n_5$ 1.67000 | $v_5$ 57.07 |
| $r_{11}^*$ −43.313 | | | |
| | $d_{11}$ 10.100 − 7.458 − 9.011 | | |
| $r_{12}$ 59.009 | | | |
| | $d_{12}$ 1.400 | $n_6$ 1.84666 | $v_6$ 23.82 |
| $r_{13}$ 13.829 | | | |
| | $d_{13}$ 5.200 | $n_7$ 1.77250 | $v_7$ 49.77 |
| $r_{14}$ −26.404 | | | |
| | $d_{14}$ 7.000 − 9.642 − 8.089 | | |
| $r_{15}$ INF | | | |
| | $d_{15}$ 6.000 | $n_8$ 1.51680 | $v_8$ 64.20 |
| $r_{16}$ INF | | | |

$f = 52.5 − 19.0 − 9.28$
$F = 1.87 − 1.64 − 1.43$
Aspheric surface coefficients:
$^*r_6: \epsilon = −0.10744 \cdot 10$
$A_4 = 0.17008 \cdot 10^{-4}$
$A_6 = −0.13234 \times 10^{-6}$
$A_8 = −0.31991 \times 10^{-8}$
$^*r_{11}: \epsilon = −0.21680 \cdot 10$
$A_4 = 0.24628 \times 10^{-4}$
$A_6 = 0.10635 \times 10^{-6}$
$A_8 = −0.24008 \cdot 10^{-9}$
$A_{10} = 0.41035 \cdot 10^{-9}$
$A_{12} = −0.22528 \times 10^{-11}$

TABLE 8
(Embodiment 8)

| radius of curvature | axial distance | refractive index | Abbe number |
|---|---|---|---|
| $r_1$ 39.200 | | | |
| | $d_1$ 1.800 | $n_1$ 1.84666 | $v_1$ 23.82 |
| $r_2$ 23.580 | | | |
| | $d_2$ 1.300 | | |
| $r_3$ 24.835 | | | |
| | $d_3$ 6.000 | $n_2$ 1.77250 | $v_2$ 49.77 |
| $r_4$ 439.725 | | | |
| | $d_4$ 35.411 − 18.273 − 1.999 | | |
| $r_5$ −53.816 | | | |
| | $d_5$ 1.000 | $n_3$ 1.77250 | $v_3$ 49.77 |
| $r_6^*$ 9.800 | | | |
| | $d_6$ 3.200 | | |
| $r_7$ 17.999 | | | |
| | $d_7$ 2.700 | $n_4$ 1.84666 | $v_4$ 23.82 |
| $r_8$ 42.310 | | | |
| | $d_8$ 2.700 − 19.838 − 36.112 | | |
| $r_9$ INF | | | |
| | $d_9$ 1.800 | | |
| $r_{10}$ 82.133 | | | |
| | $d_{10}$ 3.100 | $n_5$ 1.67000 | $v_5$ 57.07 |
| $r_{11}^*$ −40.814 | | | |
| | $d_{11}$ 10.100 − 8.653 − 10.598 | | |
| $r_{12}$ 44.629 | | | |
| | $d_{12}$ 1.400 | $n_6$ 1.84666 | $v_6$ 23.82 |
| $r_{13}$ 14.915 | | | |
| | $d_{13}$ 5.200 | $n_7$ 1.69100 | $v_7$ 54.75 |
| $r_{14}$ −24.568 | | | |
| | $d_{14}$ 7.000 − 8.447 − 6.502 | | |
| $r_{15}$ INF | | | |
| | $d_{15}$ 6.000 | $n_8$ 1.51680 | $v_8$ 64.20 |
| $r_{16}$ INF | | | |

TABLE 8-continued
(Embodiment 8)

| radius of curvature | axial distance | refractive index | Abbe number |
|---|---|---|---|
| $r_{16}$ INF | | | |

$f = 52.5 − 19.0 − 9.28$
$F = 1.83 − 1.64 − 1.43$
Aspheric surface coefficients:
$^*r_6: \epsilon = −0.14230 \cdot 10$
$A_4 = 0.20643 \times 10^{-3}$
$A_6 = −0.68665 \times 10^{-6}$
$A_8 = −0.37424 \times 10^{-9}$
$^*r_{11}: \epsilon = −0.27509 \times 10$
$A_4 = 0.18210 \times 10^{-4}$
$A_6 = 0.13638 \times 10^{-6}$
$A_8 = −0.43128 \times 10^{-9}$

TABLE 9
(Embodiment 9)

| radius of curvature | axial distance | refractive index | Abbe number |
|---|---|---|---|
| $r_1$ 39.683 | | | |
| | $d_1$ 1.700 | $n_1$ 1.84666 | $v_1$ 23.83 |
| $r_2$ 23.474 | | | |
| | $d_2$ 1.400 | | |
| $r_3$ 24.829 | | | |
| | $d_3$ 6.000 | $n_2$ 1.77250 | $v_2$ 49.77 |
| $r_4$ 921.795 | | | |
| | $d_4$ 34.665 − 18.010 − 2.000 | | |
| $r_5$ −83.333 | | | |
| | $d_5$ 1.000 | $n_3$ 1.77250 | $v_3$ 49.77 |
| $r_6$ 10.363 | | | |
| | $d_6$ 3.000 | | |
| $r_7^*$ 25.391 | | | |
| | $d_7$ 3.500 | $n_4$ 1.84666 | $v_4$ 23.83 |
| $r_8$ 68.915 | | | |
| | $d_8$ 3.000 − 19.656 − 35.665 | | |
| $r_9$ INF | | | |
| | $d_9$ 2.100 | | |
| $r_{10}^*$ 148.259 | | | |
| | $d_{10}$ 3.000 | $n_5$ 1.77250 | $v_5$ 49.77 |
| $r_{11}$ −35.983 | | | |
| | $d_{11}$ 11.400 − 9.033 − 10.713 | | |
| $r_{12}$ 48.401 | | | |
| | $d_{12}$ 1.700 | $n_6$ 1.84666 | $v_6$ 23.83 |
| $r_{13}$ 14.523 | | | |
| | $d_{13}$ 5.500 | $n_7$ 1.71300 | $v_7$ 53.93 |
| $r_{14}$ −25.096 | | | |
| | $d_{14}$ 7.000 − 9.367 − 7.687 | | |
| $r_{15}$ INF | | | |
| | $d_{15}$ 6.000 | $n_8$ 1.51680 | $v_8$ 64.20 |
| $r_{16}$ INF | | | |

$f = 52.5 − 19.0 − 9.28$
$F = 1.90 − 1.64 − 1.43$
Aspheric surface coefficients:
$^*r_7: \epsilon = 0.10000 \times 10$
$A_4 = 0.59860 \times 10^{-4}$
$A_6 = −0.65476 \times 10^{-7}$
$A_8 = 0.34805 \times 10^{-7}$
$A_{10} = −0.99660 \times 10^{-9}$
$A_{12} = 0.95496 \times 10^{-11}$
$^*r_{10}: \epsilon = 0.10000 \times 10$
$A_4 = −0.10560 \times 10^{-4}$
$A_6 = −0.10734 \times 10^{-5}$
$A_8 = 0.31135 \times 10^{-7}$
$A_{10} = −0.43306 \times 10^{-9}$
$A_{12} = 0.22140 \times 10^{-11}$

TABLE 10
(Embodiment 10)

| radius of curvature | axial distance | refractive index | Abbe number |
|---|---|---|---|
| $r_1$ 44.739 | | | |
| | $d_1$ 1.800 | $n_1$ 1.84666 | $v_1$ 23.82 |
| $r_2$ 26.058 | | | |
| | $d_2$ 1.700 | | |
| $r_3$ 27.829 | | | |
| | $d_3$ 5.900 | $n_2$ 1.77250 | $v_2$ 49.77 |
| $r_4$ −6754.929 | | | |
| | $d_4$ 41.678 − 24.947 − 2.000 | | |

TABLE 10-continued (Embodiment 10)

| radius of curvature | axial distance | refractive index | Abbe number |
|---|---|---|---|
| $r_5$ −50.826 | | | |
| | $d_5$ 1.200 | $n_3$ 1.77250 | $v_3$ 49.77 |
| $r_6$* 10.699 | | | |
| | $d_6$ 2.800 | | |
| $r_7$ 18.421 | | | |
| | $d_7$ 3.400 | $n_4$ 1.84666 | $v_4$ 23.82 |
| $r_8$ 41.123 | | | |
| | $d_8$ 3.000 − 19.821 − 42.768 | | |
| $r_9$ INF | | | |
| | $d_9$ 1.900 | | |
| $r_{10}$* 150.929 | | | |
| | $d_{10}$ 3.300 | $n_5$ 1.74250 | $v_5$ 52.47 |
| $r_{11}$ −45.612 | | | |
| | $d_{11}$ 14.000 − 9.353 − 11.959 | | |
| $r_{12}$ 40.447 | | | |
| | $d_{12}$ 1.700 | $n_6$ 1.84666 | $v_6$ 23.82 |
| $r_{13}$ 15.287 | | | |
| | $d_{13}$ 5.700 | $n_7$ 1.69100 | $v_7$ 54.75 |
| $r_{14}$ −28.959 | | | |
| | $d_{14}$ 7.000 − 11.647 − 9.041 | | |
| $r_{15}$ INF | | | |
| | $d_{15}$ 6.000 | $n_8$ 1.51680 | $v_8$ 64.20 |
| $r_{16}$ INF | | | |

$f = 70.0 - 25.0 - 9.25$
$F = 2.4 - 1.64 - 1.43$
Aspheric surface coefficients:
*$r_6$: $\epsilon = 0.10000 \cdot 10$
$A_4 = -0.10698 \cdot 10^{-3}$
$A_6 = 0.10683 \cdot 10^{-5}$
$A_8 = -0.42375 \cdot 10^{-7}$
$A_{10} = 0.50598 \cdot 10^{-9}$
$A_{12} = -0.29087 \cdot 10^{-11}$
*$r_{10}$: $\epsilon = 0.10000 \cdot 10$
$A_4 = -0.27597 \cdot 10^{-4}$
$A_6 = 0.44716 \cdot 10^{-6}$
$A_8 = -0.98689 \times 10^{-8}$
$A_{10} = 0.92844 \cdot 10^{-10}$
$A_{12} = -0.32811 \cdot 10^{-12}$

TABLE 11

(Embodiment 11)

| radius of curvature | axial distance | refractive index | Abbe number |
|---|---|---|---|
| $r_1$ 38.743 | | | |
| | $d_1$ 1.700 | $n_1$ 1.84666 | $v_1$ 23.83 |
| $r_2$ 23.197 | | | |
| | $d_2$ 1.400 | | |
| $r_3$ 24.527 | | | |
| | $d_3$ 5.800 | $n_2$ 1.77250 | $v_2$ 49.77 |
| $r_4$ 575.688 | | | |
| | $d_4$ 34.494 − 17.801 − 2.000 | | |
| $r_5$ −123.030 | | | |
| | $d_5$ 1.100 | $n_3$ 1.77250 | $v_3$ 49.77 |
| $r_6$ 9.653 | | | |
| | $d_6$ 2.700 | | |
| $r_7$ 26.736 | | | |
| | $d_7$ 3.100 | $n_4$ 1.84666 | $v_4$ 23.83 |
| $r_8$* 88.694 | | | |
| | $d_8$ 2.400 − 19.092 − 34.894 | | |
| $r_9$ INF | | | |
| | $d_9$ 1.900 | | |
| $r_{10}$* 82.697 | | | |
| | $d_{10}$ 2.800 | $n_5$ 1.77250 | $v_5$ 49.77 |
| $r_{11}$ −47.329 | | | |
| | $d_{11}$ 11.700 − 9.738 − 11.543 | | |
| $r_{12}$ 30.916 | | | |
| | $d_{12}$ 1.500 | $n_6$ 1.84666 | $v_6$ 23.83 |
| $r_{13}$ 12.226 | | | |
| | $d_{13}$ 5.400 | $n_7$ 1.71300 | $v_7$ 53.93 |
| $r_{14}$ −32.499 | | | |
| | $d_{14}$ 7.000 − 8.962 − 7.157 | | |
| $r_{15}$ INF | | | |
| | $d_{15}$ 6.000 | $n_8$ 1.51680 | $v_8$ 64.20 |
| $r_{16}$ INF | | | |

$f = 52.5 - 19.0 - 9.25$
$F = 1.91 - 1.64 - 1.43$
Aspheric surface coefficients:
*$r_8$: $\epsilon = 0.10000 \times 10$
$A_4 = -0.10254 \times 10^{-3}$
$A_6 = 0.24243 \times 10^{-5}$
$A_8 = -0.14230 \times 10^{-6}$
$A_{10} = 0.31347 \times 10^{-8}$
$A_{12} = -0.26838 \times 10^{-10}$
*$r_{10}$: $\epsilon = 0.10000 \times 10$
$A_4 = 0.26565 \times 10^{-4}$
$A_6 = 0.46836 \times 10^{-6}$
$A_8 = -0.99380 \times 10^{-8}$
$A_{10} = 0.81840 \times 10^{-10}$
$A_{12} = -0.20819 \times 10^{-12}$

TABLE 12

| Parameter | Emb. 1 | Emb. 2 | Emb. 3 | Emb. 4 | Emb. 5 | Emb. 6 |
|---|---|---|---|---|---|---|
| $\phi$ I | 0.0245 | 0.0221 | 0.0182 | 0.0167 | 0.0167 | 0.0166 |
| $\phi$ II | −0.073 | −0.0677 | −0.0637 | −0.0596 | −0.0596 | −0.0597 |
| $\phi$ III | 0.0294 | 0.0172 | 0.0261 | 0.0235 | 0.0265 | 0.0264 |
| f T | 29.6 | 39.0 | 52.5 | 52.5 | 52.5 | 52.5 |
| f M | 17.44 | 20.01 | 22.07 | 22.07 | 22.07 | 22.07 |
| f W | 10.27 | 10.27 | 9.28 | 9.28 | 9.28 | 9.28 |

| Parameter | Emb. 7 | Emb. 8 | Emb. 9 | Emb. 10 | Emb. 11 |
|---|---|---|---|---|---|
| $\phi$ I | 0.0167 | 0.0158 | 0.0163 | 0.0150 | 0.0163 |
| $\phi$ II | −0.0596 | −0.0594 | −0.0587 | −0.0574 | −0.0600 |
| $\phi$ III | 0.0252 | 0.0243 | 0.0265 | 0.0211 | 0.0254 |
| f T | 52.5 | 52.5 | 52.5 | 70.0 | 52.5 |
| f M | 22.07 | 22.07 | 22.07 | 25.45 | 22.07 |
| f W | 9.28 | 9.28 | 9.28 | 9.25 | 9.28 |

TABLE 13

| Condition | Emb. 1 | Emb. 2 | Emb. 3 | Emb. 4 | Emb. 5 | Emb. 6 |
|---|---|---|---|---|---|---|
| (1) $0.21 < \phi I / |\phi II| < 0.39$ | 0.336 | 0.326 | 0.286 | 0.280 | 0.280 | 0.280 |
| (2) $0.03 < AII/fw < 0.70$ | 0.185 | 0.175 | 0.496 | 0.248 | 0.259 | 0.248 |
| (3) $0.55 < fM \cdot (n_2 - 1)/r_3 < 0.95$ | 0.644 | 0.798 | 0.718 | 0.691 | 0.671 | 0.685 |
| (4) $0.15 < AIII-IV/fM < 0.75$ | 0.264 | 0.365 | 0.485 | 0.421 | 0.417 | 0.467 |
| (5) $0.6 < \phi III / \phi I < 1.9$ | 1.2 | 0.778 | 1.434 | 1.407 | 1.587 | 1.590 |
| (6) $-2.1 < fM \cdot (1 - n_3)/r_6 < -1.3$ | −1.603 | −1.793 | −1.731 | −1.732 | −1.737 | −1.526 |
| (7) $0 < \phi IVP/\phi IVR < 1.5$ | 0.085 | 0.817 | 0.474 | 0.481 | 0.630 | 0.645 |
| (8) $0.30 < r_6/r_7 < 0.90$ | 0.701 | 0.790 | 0.480 | 0.682 | 0.616 | 0.718 |
| (9) $0 < \phi IIIR/\phi III < 2.2$ | 1.660 | 1.982 | 0.710 | 1.005 | 0.459 | 0.634 |

TABLE 13-continued

| Condition | Emb. 7 | Emb. 8 | Emb. 9 | Emb. 10 | Emb. 11 |
|---|---|---|---|---|---|
| (1) $0.21 < \phi I/|\phi II| < 0.39$ | 0.280 | 0.266 | 0.278 | 0.261 | 0.272 |
| (2) $0.03 < AII/f_W < 0.70$ | 0.345 | 0.345 | 0.323 | 0.303 | 0.291 |
| (3) $0.55 < fM \cdot (n_2-1)/r_3 < 0.95$ | 0.706 | 0.686 | 0.687 | 0.706 | 0.695 |
| (4) $0.15 < AIII\text{-}IV/fM < 0.75$ | 0.458 | 0.458 | 0.517 | 0.550 | 0.530 |
| (5) $0.6 < \phi III/\phi I < 1.9$ | 1.509 | 1.538 | 1.626 | 1.407 | 1.558 |
| (6) $-2.1 < fM \cdot (1-n_3)/r_6 < -1.3$ | −1.736 | −1.740 | −1.645 | −1.838 | −1.766 |
| (7) $0 < \phi IVP/\phi IVR < 1.5$ | 0.490 | 0.675 | 0.616 | 0.877 | 1.248 |
| (8) $0.30 < r_6/r_7 < 0.90$ | 0.573 | 0.544 | 0.408 | 0.581 | 0.361 |
| (9) $0 < \phi IIIR/\phi III < 2.2$ | 0.614 | 0.676 | 0.810 | 0.771 | 0.643 |

What is claimed is:

1. A zoom lens system, comprising from the object side:
   a first lens unit of a positive refractive power and consisting of, from the object side, a first negative meniscus lens element convex to the object side, a second positive lens element, located at the image side of the first negative meniscus lens element and having an air space therebetween, having a stronger refractive surface on its object side surface;
   a second lens unit of a negative refractive power and consisting of, from the object side, a third negative lens element having a stronger refractive surface on its image side surface, and a fourth positive lens element, located at the image side of the third negative lens element and having an air space therebetween, said second lens unit including an asperic surface;
   a third lens unit of a positive refractive power and consisting of a single positive lens element having an aspheric surface;
   a fourth lens unit of a positive refractive power and including a negative lens element, and
   the second lens unit being shiftable in the zooming operation and only one of the first, third, and fourth lens units also being shiftable in the zooming operation.

2. A zoom lens system as claimed in claim 1, wherein the lens system fulfills the following conditions:

$$0.21 < \phi I/|\phi II| < 0.39$$
$$0.03 < AII/f_W < 0.70$$
$$0.55 < fM \cdot (n_2-1)/r_3 < 0.95$$
(wherein $fM = (f_W \cdot f_T)^{\frac{1}{2}}$)

and wherein, $\phi I$ represents a refractive power of the first lens unit;
$\phi II$ represents a refractive power of the second lens unit;
AII represents an axial thickness of an air lens element formed by the third negative lens element and the fourth positive lens element in the second lens unit;
$f_W$ represents a focal length of the whole lens system in the shortest focal length condition;
$f_T$ represents a focal length of the whole lens system in the longest focal length condition;
$n_i$ represents a refractive index of the i-th lens element counted from the object side; and
$r_i$ represents a radius of curvature of the i-th lens surface counted from the object side.

3. A zoom lens system as claimed in claim 1, further comprising an aperture diaphram located between the second lens unit and the third lens unit.

4. A zoom lens system as claimed in claim 3, wherein the lens system fulfills the following conditions:

$$0.15 < AIII\text{-}IV/fM < 0.75$$
(wherein $fM = (f_W \cdot f_T)^{\frac{1}{2}}$)
$$0.6 < \phi III/\phi I < 1.9$$

wherein,

AIII-IV represents an axial distance between the third lens unit and the fourth lens unit; and
$\phi III$ represents a refractive power of the third lens unit.

5. A zoom lens system as claimed in claim 3, wherein the fourth lens unit consists of one negative lens element and one positive lens element cemented with each other and wherein the lens system fulfills the following conditions:

$$-2.1 < fM \cdot (1-n_3)/r_6 < -1.3$$
$$0 < \phi IVP/\phi IVR < 1.5$$
($\phi IVP = (n_6-1)/r_{12}$, $\phi IVR = (1-n_7)/r_{14}$)

wherein, $n_i$ represents a refractive index of the i-th lens element counted from the object side;
$r_i$ represents a radius of curvature of the i-th lens surface counted from the object side with including the aperture diaphram;
$\phi IVP$ represents a refractive power of the object side surface of the fourth lens unit; and
$\phi IVR$ represents a refractive power of the image side surface of the fourth lens unit.

6. A zoom lens system as claimed in claim 5, wherein said fourth positive lens element in the second lens unit is a positive meniscus lens element having a stronger refractive power on its object side surface, and wherein said lens system further fulfills the following conditions:

$$0.30 < r_6/r_7 < 0.90$$
$$0.4 < \phi IIIR/\phi III < 2.2$$
(wherein $\phi IIIR = (1-n_5)/r_{11}$)

wherein, $\phi IIIR$ represents a refractive power of the image side surface of the third lens unit.

7. A zoom lens system as claimed in claim 6, wherein the lens system further fulfills the following conditions;

$$0.15 < AIII\text{-}IV/fM < 0.75$$
(wherein $fM = (f_W \cdot f_T)^{\frac{1}{2}}$)
$$0.6 < \phi III/\phi I < 1.9$$

wherein,

AIII-IV represents an axial distance between the third lens unit and the fourth lens unit; and
$\phi III$ represents a refractive power of the third lens unit.

8. A zoom lens system as claimed in claim 5, wherein said first lens unit is shiftable in the zooming operation with said second lens unit.

9. A zoom lens system as claimed in claim 5, wherein said fourth lens unit is shiftable in the zooming operation with said second lens unit.

10. A zoom lens system, comprising from the object side:
    a first lens unit of a positive refractive power and consisting of, from the object side, a first negative meniscus lens element convex to the object side, a second positive lens element, located at the image side of the first negative meniscus lens element and having an air space therebetween, having a stronger refractive surface on its object side surface, said first lens unit being stationary in the zooming operation;

a second lens unit of a negative refractive power and consisting of, from the object side, a third negative lens element having a stronger refractive surface on its image side surface, and a fourth positive lens element, located at the image side of the third negative lens element and having an air space therebetween said second lens unit being shiftable in the zooming operation;

a third lens unit of a positive refractive power and consisting of a single positive lens element, said third lens unit being stationary in the zooming operation; and a fourth lens unit of a positive refractive power and including a positive lens element and a negative lens element, said fourth lens unit being shiftable to change a variable air space formed between the third lens unit and the fourth lens unit in the zooming operation.

11. A zoom lens system as claimed in claim 10, wherein said third lens unit is stationary in the zooming operation.

12. A zoom lens system as claimed in claim 11, further comprising an aperture diaphram located between the second lens unit and the third lens unit and being stationary in the zooming operation.

13. A zoom lens system as claimed in claim 10, wherein said second lens unit has an aspheric surface.

14. A zoom lens system as claimed in claim 10, wherein said fourth lens unit consists of a negative lens element and a positive lens element cemented with each other.

15. A zoom lens system as claimed in claim 14, wherein said third lens unit has an aspheric surface.

16. A zoom lens system, comprising from the object side;

a first lens unit of a positive refractive power and consisting of, from the object side, a first negative meniscus lens element convex to the object side, a second positive lens element, located at the image side of the first negative meniscus lens element with having an air space therebetween, having a stronger refractive surface on its object side surface;

a second lens unit of a negative refractive power and consisting of, from the object side, a third negative lens element having a stronger refractive surface on its image side surface, and a fourth positive lens element, located at the image side of the third negative lens element with having an air space therebetween;

a third lens unit of a positive refractive power and consisting of a fifth single positive lens element; and a fourth lens unit of a positive refractive power and consisting of a positive lens element and a negative lens element cemented with each other;

wherein the whole lens system consists of seven lens element; and wherein the second lens unit is shiftable in the zooming operation and at least one of the first, third and fourth lens unit is also shiftable in the zooming operation.

17. A zoom lens system as claimed in claim 16, wherein said second lens unit has an aspheric surface and said third lens unit also has an aspheric surface.

* * * * *